(12) United States Patent
Asano

(10) Patent No.: US 11,393,096 B2
(45) Date of Patent: Jul. 19, 2022

(54) GAS-DETECTION IMAGE PROCESSING DEVICE, GAS-DETECTION IMAGE PROCESSING METHOD, AND GAS-DETECTION IMAGE PROCESSING PROGRAM

(71) Applicant: Konica Minolta, Inc., Chiyoda-ku (JP)

(72) Inventor: Motohiro Asano, Osaka (JP)

(73) Assignee: KONICA MINOLTA, INC., Tokyo (JP)

( * ) Notice: Subject to any disclaimer, the term of this patent is extended or adjusted under 35 U.S.C. 154(b) by 162 days.

(21) Appl. No.: 16/610,287

(22) PCT Filed: Apr. 18, 2018

(86) PCT No.: PCT/JP2018/016005
§ 371 (c)(1),
(2) Date: Nov. 1, 2019

(87) PCT Pub. No.: WO2018/203480
PCT Pub. Date: Nov. 8, 2018

(65) Prior Publication Data
US 2020/0082536 A1 Mar. 12, 2020

(30) Foreign Application Priority Data

May 2, 2017 (JP) .............................. JP2017-091796

(51) Int. Cl.
*G06K 9/00* (2022.01)
*G06T 7/11* (2017.01)
(Continued)

(52) U.S. Cl.
CPC ............. *G06T 7/11* (2017.01); *G01M 3/38* (2013.01); *G06T 7/174* (2017.01); *G06V 10/40* (2022.01);
(Continued)

(58) Field of Classification Search
None
See application file for complete search history.

(56) References Cited

U.S. PATENT DOCUMENTS 5,656,813 A * 8/1997 Moore ............... G01N 21/3504
250/330
9,862,144 B2 * 1/2018 Lane ...................... B29C 70/44
(Continued)

FOREIGN PATENT DOCUMENTS

| JP | 63-163681 | 7/1988 |
| JP | 2001-349829 | 12/2001 |

(Continued)

OTHER PUBLICATIONS

Office Action dated Mar. 18, 2021 issued in U.S. Appl. No. 16/610,192.
(Continued)

*Primary Examiner* — Oneal R Mistry
(74) *Attorney, Agent, or Firm* — Cozen O'Connor

(57) ABSTRACT

A gas-detection image processing device includes a first processor, a second processor, a third processor, and a setter. The first processor generates a plurality of first images by applying processing to extract a gas candidate region to each of the plurality of infrared images captured in time series. The second processor generates a second image including a first appearance region based on two or more of the first images corresponding to the first predetermined period, and the first appearance region indicates that the gas candidate region has appeared in at least a part of the first predetermined period. The third processor generates a third image including a second appearance region based on two or more of the first images corresponding to a second predetermined period different from the first predetermined period, and the second appearance region indicates that the gas candidate region has appeared in at least a part of the second prede-
(Continued)

termined period. The setter sets, in the third image, a peripheral region in a periphery of a position corresponding to a position of the first appearance region of the second image.

17 Claims, 20 Drawing Sheets

(51) Int. Cl.
  *G06T 7/174* (2017.01)
  *G01M 3/38* (2006.01)
  *G06V 10/40* (2022.01)

(52) U.S. Cl.
  CPC ............... *G06T 2207/10016* (2013.01); *G06T 2207/10048* (2013.01)

(56) References Cited

U.S. PATENT DOCUMENTS

| | | | | |
|---|---|---|---|---|
| 2006/0220888 A1* | 10/2006 | Germouni | ............. | G06T 7/0008 340/605 |
| 2010/0078561 A1* | 4/2010 | Gorin | ................... | G06T 7/0002 250/338.5 |
| 2011/0081040 A1* | 4/2011 | Conger | .................... | G01J 3/42 382/207 |
| 2012/0314080 A1* | 12/2012 | Lee | ....................... | G01M 3/002 348/159 |
| 2013/0113939 A1* | 5/2013 | Strandemar | .............. | H04N 5/33 348/164 |
| 2014/0008526 A1* | 1/2014 | Zeng | ........................ | H04N 5/33 250/252.1 |
| 2015/0371386 A1 | 12/2015 | Zeng et al. | | |
| 2018/0106674 A1* | 4/2018 | Sandsten | ............... | G01J 9/0215 |
| 2018/0182084 A1 | 6/2018 | Lee et al. | | |
| 2019/0187000 A1* | 6/2019 | Gamfeldt | ................. | G01J 5/0802 |
| 2019/0212261 A1 | 7/2019 | Lannestedt et al. | | |
| 2020/0116583 A1* | 4/2020 | Hedberg | .................. | H04N 5/33 |

FOREIGN PATENT DOCUMENTS

| | | |
|---|---|---|
| JP | 2006-268200 | 10/2006 |
| JP | 2012-058093 | 3/2012 |
| JP | 2016-206139 | 12/2016 |

OTHER PUBLICATIONS

Notice of Allowance dated Jan. 5, 2021 issued in U.S. Appl. No. 16/610,192.

Office Action dated Aug. 6, 2021 issued in U.S. Appl. No. 16/610,192.

* cited by examiner

Im0-1

Im0-2

101

GAS-DETECTION IMAGE PROCESSING DEVICE, GAS-DETECTION IMAGE PROCESSING METHOD, AND GAS-DETECTION IMAGE PROCESSING PROGRAM

RELATED APPLICATIONS

This is a U.S. National Phase Application under 35 USC 371 of International Application PCT/JP2018/016005 filed on Apr. 18, 2018.

This application claims the priority of Japanese application no. 2017-091796 filed May 2, 2017, the entire content of which is hereby incorporated by reference.

TECHNICAL FIELD

The present invention relates to a gas detection technology utilizing infrared images.

BACKGROUND ART

When a gas leakage occurs, a temperature is slightly changed in a region where a leaked gas floats in the air. As a gas detection technology utilizing this principle, gas detection utilizing infrared images is known.

As the gas detection utilizing infrared images, Patent Literature 1 discloses, for example, a gas leakage detection device including: an infrared camera that photographs an inspection target region; and an image processor that processes an infrared image photographed by the infrared camera, and the image processor includes a fluctuation extraction unit that extracts, from a plurality of infrared images arranged in time series, dynamic fluctuation caused by gas leakage.

The inventor of the present invention has found, in the gas detection using infrared images, that a gaseous substance (such as cloud or steam) that is flowing is erroneously detected as a gas that constantly comes out from the same position (such as a gas that constantly comes out from a leakage source like a pipe). Note that the same position may be perfectly the same position or may be substantially the same position. The "substantially the same position" means as follows. For example, in a case where a place (leakage source) of leakage that has occurred in a certain pipe is photographed in a manner overlapping with another pipe and the like that are located more on a front side than the leakage source, all of the gas leaked from the leakage source is not photographed, and an image of a part of the gas not overlapping with another pipe and the like is captured. When the gas fluctuates due to influence of wind or the like, there may be a case where the gas does not seem, on an image, to come out from the same leakage source (same position). This case is referred to as that the gas comes out from substantially the same position.

CITATION LIST

Patent Literature

Patent Literature 1: JP 2012-58093 A

SUMMARY OF INVENTION

The present invention is directed to providing a gas-detection image processing device, a gas-detection image processing method, and a gas-detection image processing program which are capable of improving gas detection accuracy.

To achieve the above-mentioned object, a gas-detection image processing device on which one aspect of the present invention is reflected includes a first processor, a second processor, a third processor, and a setter. The first processor generates a plurality of first images by applying processing to extract a gas candidate region to each of a plurality of infrared images captured in time series. The second processor generates a second image based on two or more of the first images corresponding to a first predetermined period out of the plurality of first images, and the second image includes a first appearance region indicating that the gas candidate region has appeared at least in a part of the first predetermined period. The third processor generates a third image based on two or more of the first images corresponding to a second predetermined period different from the first predetermined period out of the plurality of first images, and the third image includes a second appearance region indicating that the gas candidate region has appeared at least in a part of the second predetermined period. The setter sets, in the third image, a peripheral region in a periphery of a position corresponding to a position of the first appearance region of the second image.

Advantages and characteristics provided by one or more embodiments of the invention are sufficiently understood from the detailed description provided below and the accompanying drawings. The detailed description and the accompanying drawings are provided as only examples and not intended as definitions to limit the present invention.

DESCRIPTION OF EMBODIMENTS

Hereinafter, one or more embodiments of the present invention will be described with reference to the drawings. However, the scope of the invention is not limited to the disclosed embodiments.

In the respective drawings, an element denoted by a same reference sign indicates the same element, and matters that have been already described for the element will not be repeatedly described and omitted. In the present specification, in a case of generically naming an element, the element will be denoted by a reference sign without a suffix (e.g., second image Im2), and in a case of individually naming an element, the element will be denoted by the reference sign with a suffix (e.g., second image Im2-1).

Figure 1A:
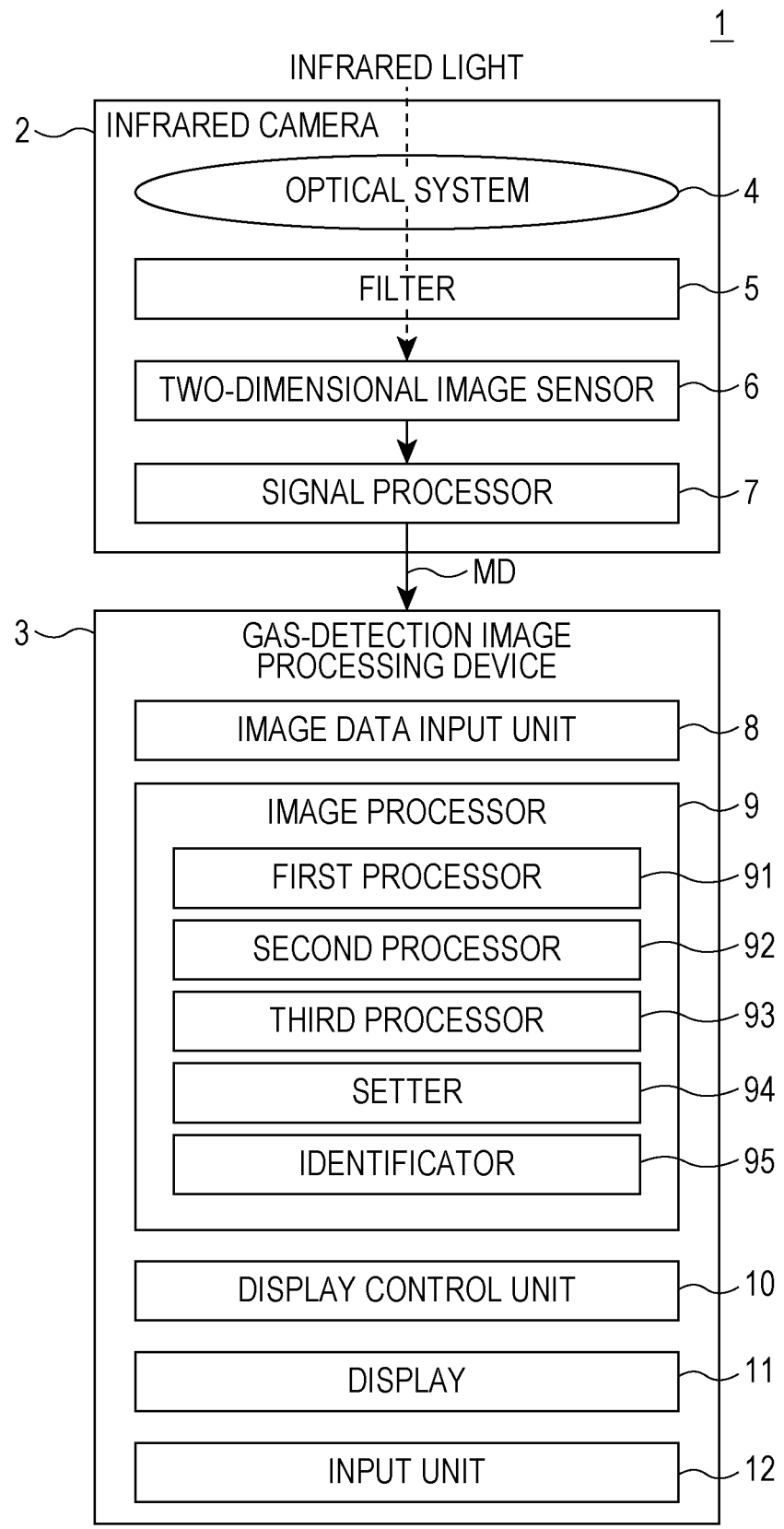
FIG. 1A is a block diagram illustrating a configuration of a gas detection system according to an embodiment.

FIG. 1A is a block diagram illustrating a configuration of a gas detection system 1 according to an embodiment. The gas detection system 1 includes an infrared camera 2 and a gas-detection image processing device 3.

The infrared camera 2 photographs a moving image of infrared images, and generates moving image data MD that represents the moving image for a subject including a monitoring target of gas leakage (for example, a place where gas transport pipes are connected). As far as plurality of infrared images captured in time series is obtained, it is not limited to the moving image. The infrared camera 2 includes an optical system 4, a filter 5, a two-dimensional image sensor 6, and a signal processor 7.

The optical system 4 forms an infrared image of a subject on the two-dimensional image sensor 6. The filter 5 is arranged between the optical system 4 and the two-dimensional image sensor 6 and allows only infrared light of a specific wavelength to pass through out of light having passed through the optical system 4. In a wavelength band of the infrared light, a wavelength band that is allowed to pass through the filter 5 is dependent on a type of gas to be detected. For example, in the case of methane, the filter 5 that allows a wavelength band of 3.2 to 3.4 μm to pass through is used. The two-dimensional image sensor 6 is, for example, a cooling type indium antimony (InSb) image sensor, and receives the infrared light having passed through the filter 5. The signal processor 7 converts an analog signal output from the two-dimensional image sensor 6 into a digital signal, and applies known image processing. This digital signal becomes moving image data MD.

The gas-detection image processing device 3 is a personal computer, a smartphone, a tablet terminal, or the like, and includes an image data input unit 8, an image processor 9, a display control unit 10, a display 11, and an input unit 12 as functional blocks.

The image data input unit 8 is a communication interface that communicates with a communication unit (not illustrated) of the infrared camera 2. The image data input unit 8 receives moving image data MD transmitted from the communication unit of the infrared camera 2. The image data input unit 8 transmits the moving image data MD to the image processor 9.

The image processor 9 applies predetermined processing to the moving image data MD. The predetermined processing is, for example, processing to generate time-series pixel data from the moving image data MD.

Figure 2:
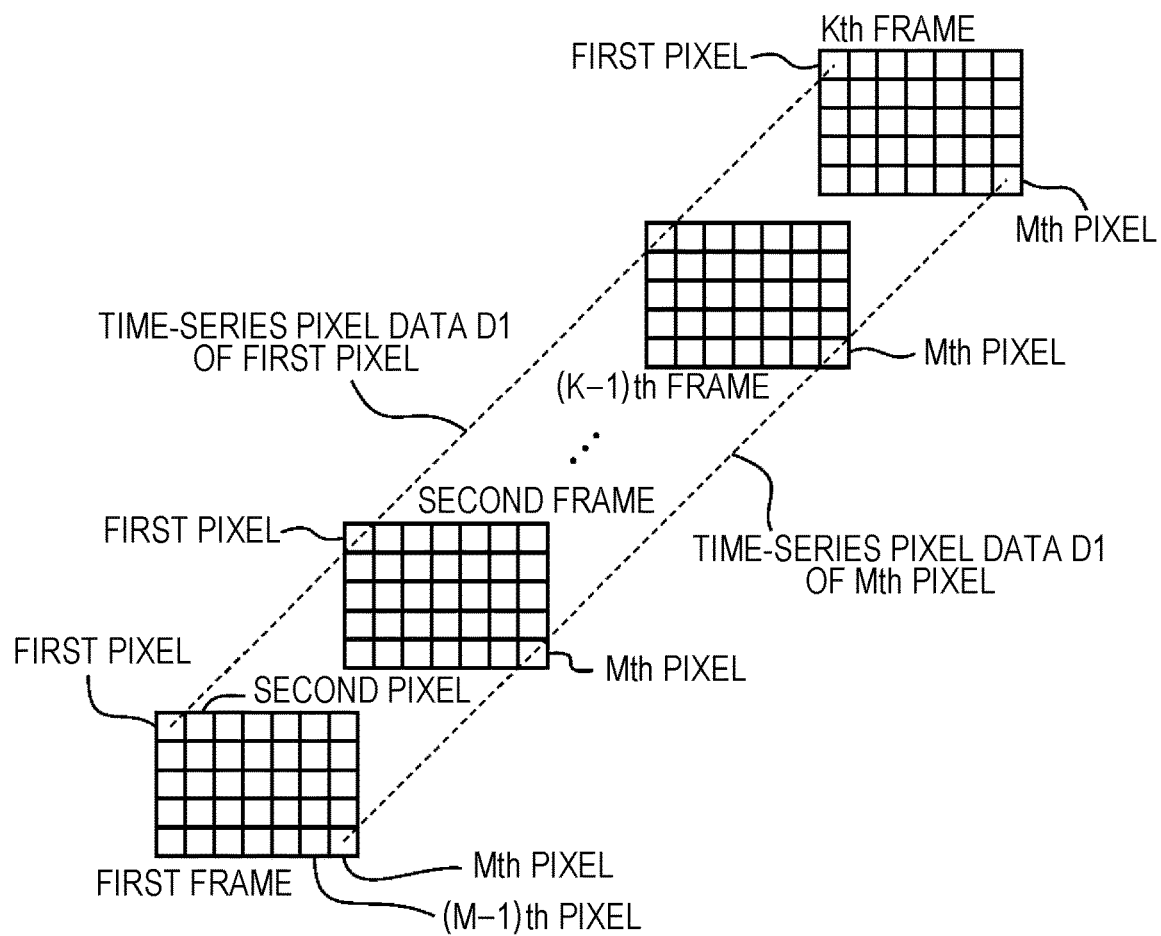
FIG. 2 is an explanatory diagram to describe time-series pixel data D1.

The time-series pixel data will be specifically described. FIG. 2 is an explanatory diagram to describe time-series pixel data D1. A moving image represented by the moving image data MD has a structure in which a plurality of frames is arranged in time series. Data obtained by arranging, in time series, pieces of pixel data of pixels located at the same position in a plurality of frames (a plurality of infrared images) are defined as the time-series pixel data D1. The number of frames of the moving image of the infrared images is defined as K. One frame includes M pixels, specifically, a first pixel, a second pixel, . . . , an (M-1)th pixel, and an Mth pixel. Physical quantities such as luminance and temperature are determined based on pixel data (pixel value).

The "pixels located at the same position in the plurality of (K) frames" stand for pixels having the same order. For example, in a case of describing a first pixel, data obtained by arranging, in time series, pixel data of a first pixel included in a first frame, pixel data of a first pixel included in a second frame, . . . , pixel data of a first pixel included in a (K-1)th frame, and pixel data of a first pixel included in a Kth frame becomes time-series pixel data D1 of the first pixel. Additionally, for example, in a case of describing an Mth pixel, data obtained by arranging, in time series, pixel data of an Mth pixel included in the first frame, pixel data of an Mth pixel included in the second frame, . . . , pixel data of an Mth pixel included in the (K-1)th frame, and pixel data of an Mth pixel included in the Kth frame becomes time-series pixel data D1 of the Mth pixel. The number of pieces of the time-series pixel data D1 is same as the number of pixels constituting one frame.

Referring to FIG. 1A, the image processor 9 includes a first processor 91, a second processor 92, a third processor 93, a setter 94, and an identificator 95. These will be described later.

The display control unit 10 causes the display 11 to display the moving image represented by the moving image data MD and the moving image that has been applied with the predetermined processing in the image processor 9.

The input unit 12 receives various inputs associated with gas detection. The gas-detection image processing device 3 according to the embodiment includes the display control unit 10, the display 11, and the input unit 12, but the gas-detection image processing device 3 may not necessarily include these units.

Figure 1B:
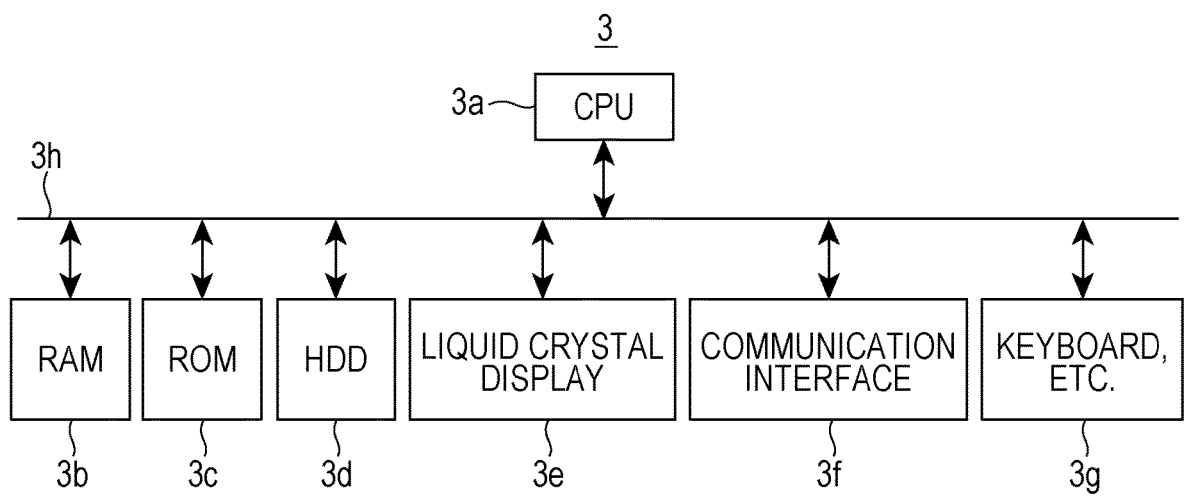
FIG. 1B is a block diagram illustrating a hardware configuration of the gas-detection image processing device illustrated in FIG. 1A.

FIG. 1B is a block diagram illustrating a hardware configuration of the gas-detection image processing device 3 illustrated in FIG. 1A. The gas-detection image processing device 3 includes a central processing unit (CPU) 3a, a random access memory (RAM) 3b, a read only memory (ROM) 3c, a hard disk drive (HDD) 3d, a liquid crystal display 3e, a communication interface 3f, a keyboard, etc. 3g, and a bus 3h connecting these. The liquid crystal display 3e is hardware that implements the display 11. Instead of the liquid crystal display 3e, an organic light emitting diode display (organic EL display), a plasma display, or the like may also be used. The communication interface 3f is hardware that implements the image data input unit 8. The keyboard, etc. 3g correspond to hardware that implements the input unit 12. Instead of the keyboard, a touch panel may also be used.

The HDD 3d stores programs to implement these respective functional blocks, and various kinds of data (e.g., moving image data MD) for the image processor 9 and the display control unit 10. The program to implement the image processor 9 is a processing program to acquire the moving image data MD and apply the predetermined processing to the moving image data MD. The program to implement the display control unit 10 is, for example, a display control program that causes the display 11 to display the moving image represented by the moving image data MD, or causes the display 11 to display the moving image that has been applied with the predetermined processing by the image processor 9. These programs are stored in advance in the HDD 3d, but not limited thereto. For example, a recording medium (such as an external recording medium like a magnetic disk or an optical disc) that records these programs may be prepared, and the programs stored in the recording medium may be stored in the HDD 3d. Also, these programs may be stored in a server connected to the gas-detection image processing device 3 via a network, and these programs may be transmitted to the HDD 3d via the network and stored in the HDD 3d. These programs may be stored in the ROM 3c instead of the HDD 3d. The gas-detection image processing device 3 may include a flash memory instead of the HDD 3d, and these programs may also be stored in the flash memory.

The CPU 3a is an example of a hardware processor, and the image processor 9 and the display control unit 10 are implemented by reading these programs from the HDD 3d, developing these programs in the RAM 3b, and executing the developed programs. However, the functions of the image processor 9 and the functions of the display control unit 10 may be partly or entirely implemented by processing applied by a digital signal processor (DSP) instead of or in combination with the processing the CPU 3a. Also, similarly, these functions may be partly or entirely implemented by processing applied by a dedicated hardware circuit instead of or in combination with processing by software.

Note that the image processor 9 includes the plurality of elements illustrated in FIG. 1A. Accordingly, a program to implement these elements is stored in the HDD 3d. In other words, programs to respectively implement the first processor 91 to the third processor 93, the setter 94, and the identificator 95 are stored in the HDD 3d. These programs will be referred to as a first processing program to a third processing program, a setting program, and an identification program.

These programs will be referred to by using element definitions. The first processor 91 and the first processing program will be described as an example. The first processor 91 applies processing to extract a gas candidate region to each of a plurality of infrared images captured in time series, thereby generating a plurality of first images based on each of the plurality of infrared images. The first processing program is a program to apply processing to extract a gas candidate region to each of a plurality of infrared images captured in time series, thereby generating a plurality of first images based on each of the plurality of infrared images.

Figure 12:
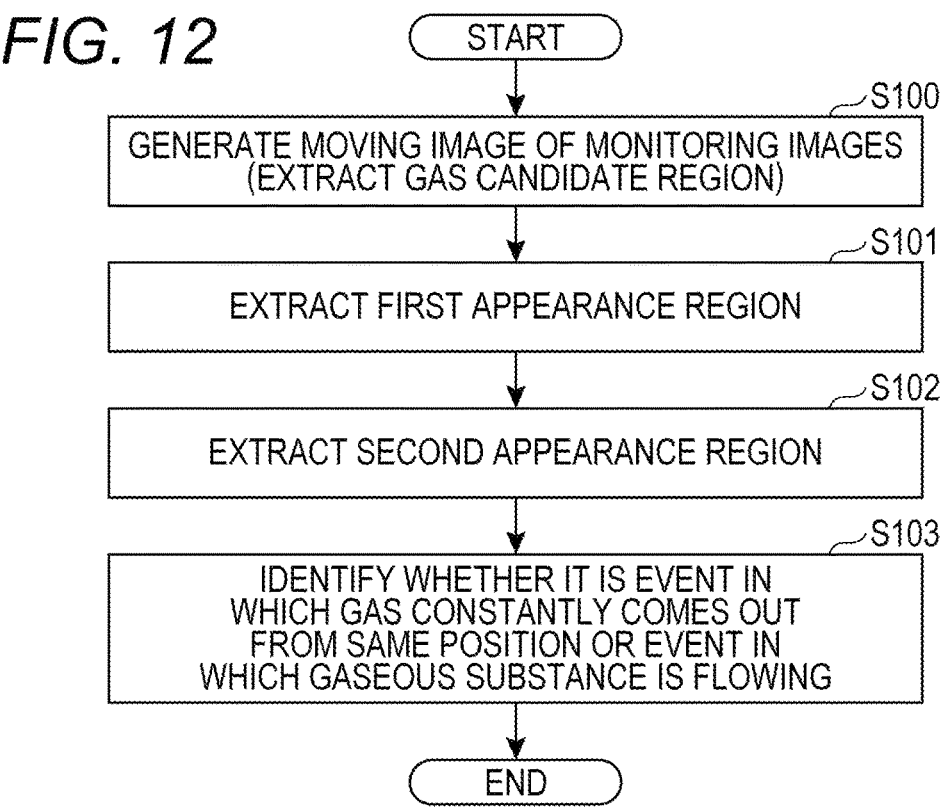
FIG. 12 is a flowchart illustrating image processing executed in the embodiment in order to identify whether a gas candidate is a gas that constantly comes out from the same position or a gaseous substance that is flowing.

A flowchart of these programs (first processing program, second processing program, and the like) executed by the CPU 3a is illustrated in FIG. 12 described later.

The inventor of the present invention has found, in gas detection utilizing infrared images, that in a case where gas leakage and a background temperature change occur in parallel and the background temperature change is larger than a temperature change caused by the leaked gas, a gas leakage state cannot be displayed without considering the background temperature change. This will be described more in detail.

Figure 3:
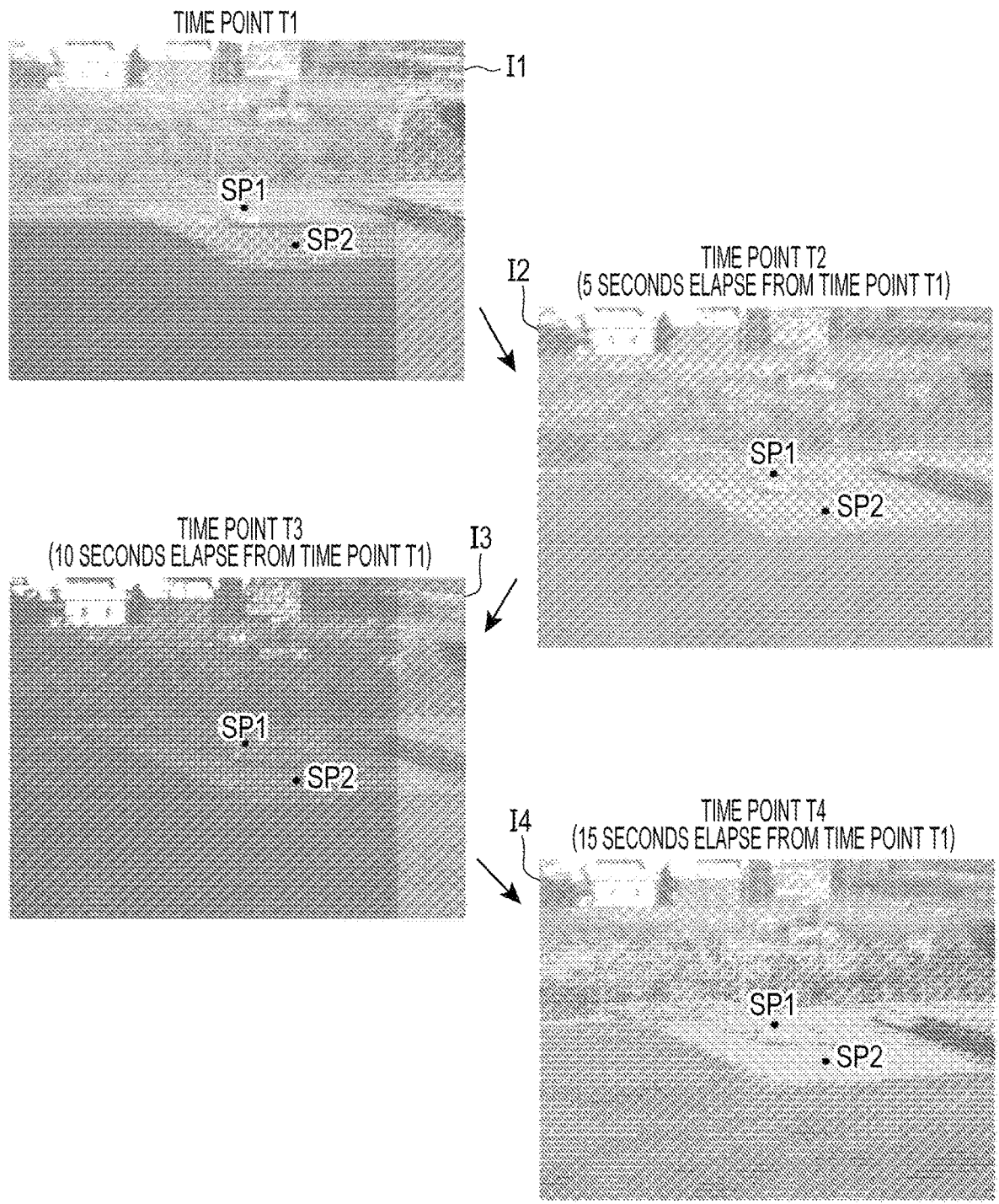
FIG. 3 provides image views illustrating, in time series, infrared images obtained by photographing an outdoor test site in a state in which gas leakage and a background temperature change occur in parallel.

FIG. 3 provides image views illustrating, in time series, infrared images obtained by photographing an outdoor test site in a state in which gas leakage and a background temperature change occur in parallel. These are the infrared images obtained by capturing a moving image with the infrared camera. At the test site, there is a point SP1 where a gas can be emitted. For comparison with the point SP1, a point SP2 where no gas is emitted is illustrated.

An image I1 is an infrared image of the test site photographed at a time point T1 immediately before sunlight is blocked by cloud. An image I2 is an infrared image of the test site photographed at a time point T2 that is a 5 seconds later from the time point T1. At the time point T2, a background temperature is lower than that at the time point T1 because the sunlight is blocked by the cloud.

An image I3 is an infrared image of the test site photographed at a time point T3 that is a 10-second lapse from the time point T1. At the time point T3, the background temperature is lower than that at the time point T2 because the state in which the sunlight is blocked by the cloud is continued from the time point T2 to the time point T3.

An image I4 is an infrared image of the test site photographed at a time point T4 that is 15 seconds later from the time point T1. At the time point T4, the background temperature is lower than that at the time point T3 because the state in which the sunlight is blocked by the cloud is continued from the time point T3 to the time point T4.

The background temperature has dropped by about 4° C. during the 15 seconds from the time point T1 to the time point T4. Therefore, the image I4 is generally darker than the image I1, and it can be grasped that the background temperature is lowered.

Gas emission is started at the point SP1 that is a time point after the time point T1 and before the time point T2. A temperature change caused by the emitted gas is little (about 0.5° C.). Therefore, since the background temperature change is much larger than the temperature change caused by the emitted gas, the state in which the gas comes from the point SP1 cannot be found from the image I2, the image I3, and image I4 although the gas is emitted from the point SP1 at the time point T2, the time point T3, and the time point T4.

Figure 4A:
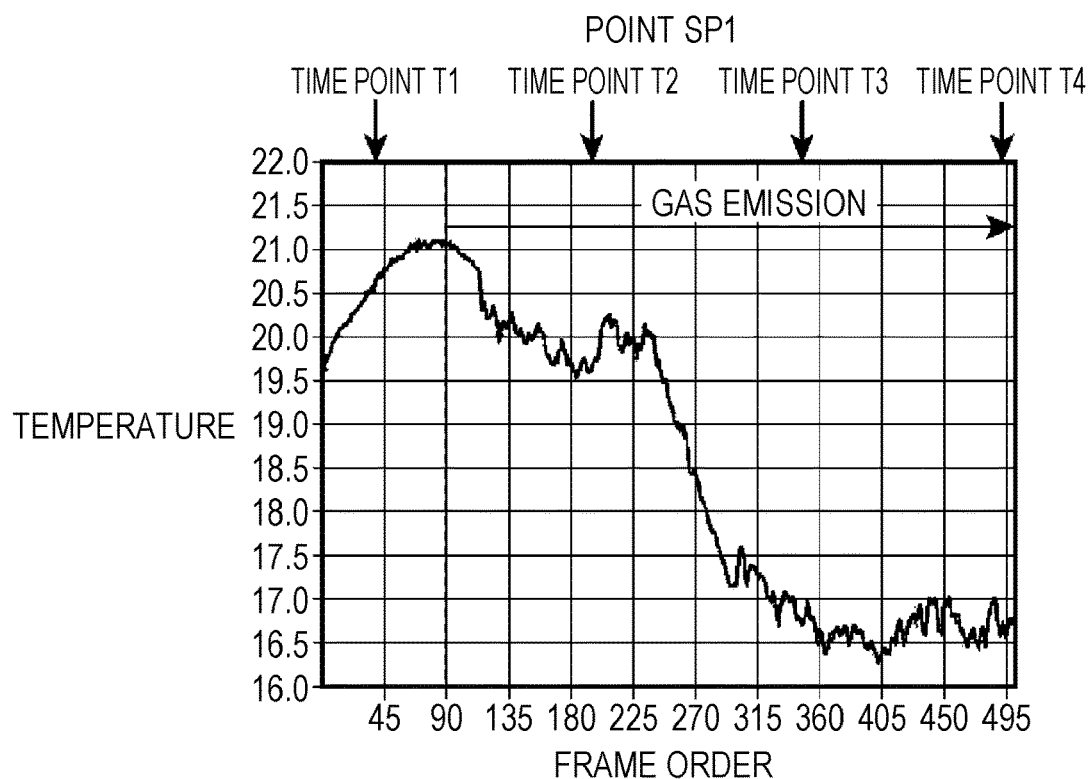
FIG. 4A is a graph illustrating a temperature change at a point SP1 of the test site.
Figure 4B:
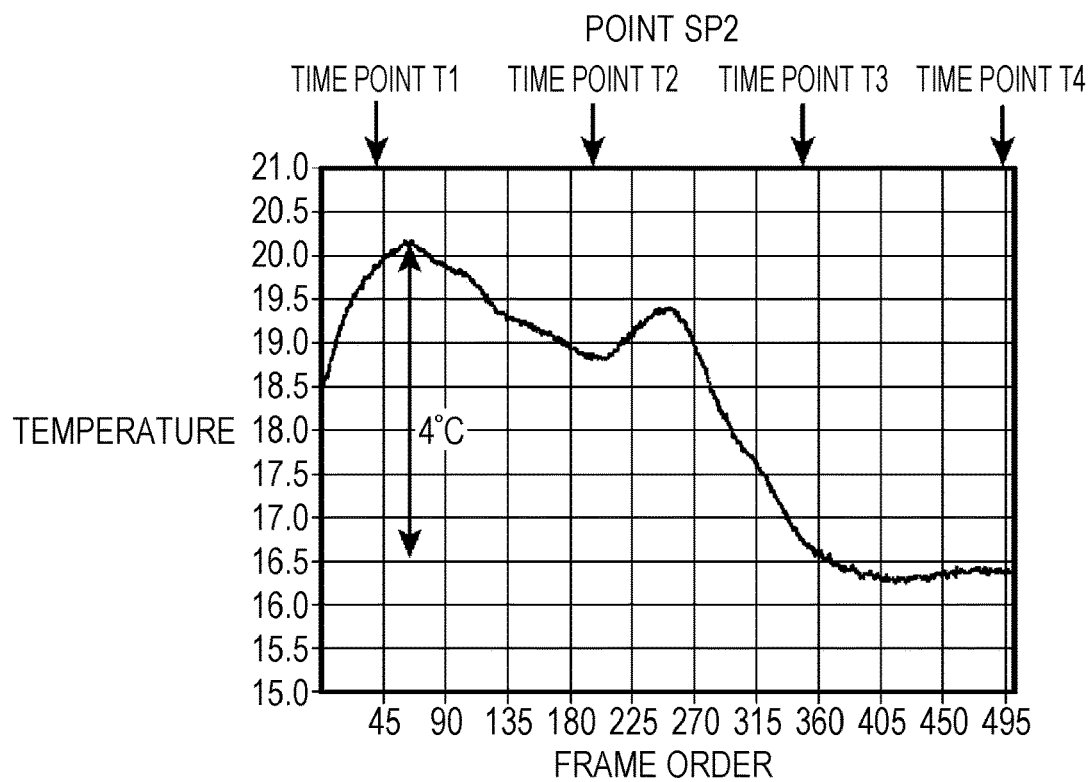
FIG. 4B is a graph illustrating a temperature change at a point SP2 of the test site.

FIG. 4A is a graph illustrating a temperature change at the point SP1 of the test site, and FIG. 4B is a graph illustrating a temperature change at the point SP2 of the test site. A vertical axis in each of the graphs represents the temperature. A horizontal axis in each of the graphs represents the frame order. For example, 45 stands for a 45th frame. A frame rate is 30 fps. Accordingly, a time from a first frame to the 450th frame is 15 seconds.

The graph illustrating the temperature change at the point SP1 differs from the graph illustrating the temperature change at the point SP2. Since no gas is emitted at the point SP2, the temperature change at the point SP2 represents the background temperature change. On the other hand, since the gas is emitted at the point SP1, the gas floats in the air at the point SP1. Therefore, the temperature change at the point SP1 represents the temperature change obtained by adding the background temperature change and the temperature change caused by the leaked gas.

It can be found from the graph illustrated in FIG. 4A that the gas is emitted at the point SP1 (in other words, it can be found that gas leakage occurs at the point SP1). However, as described above, it is not possible to find from the image I2, the image I3, and image I4 illustrated in FIG. 3 that the gas is emitted at the point SP1 (in other words, it is not possible to find that the gas leakage occurs at the point SP1).

Thus, in the case where the background temperature change is much larger than the temperature change caused by the emitted gas (leaked gas), the state in which the gas comes out from the point SP1 cannot be found from the image I2, the image I3, and the image I4 illustrated in FIG. 3.

The reason is that the moving image data MD (FIG. 1A) includes not only frequency component data indicating the temperature change caused by the leaked gas but also low frequency component data D2 having a frequency lower than that of the frequency component data and indicating the background temperature change. An image represented by the frequency component data becomes invisible due to an image represented by the low frequency component data D2 (change in brightness of the background). Referring to FIGS. 4A and 4B, slight changes included in the graph illustrating the temperature change at the point SP1 correspond to the frequency component data. The graph illustrating the temperature change at the point SP2 corresponds to the low frequency component data D2.

Hence, the image processor 9 (FIG. 1A) generates, from the moving image data MD, a plurality of pieces of time-series pixel data D1 having different pixel positions respectively (in other words, a plurality of pieces of time-series pixel data D1 constituting the moving image data MD), and applies processing to remove the low frequency component data D2 to each of the plurality of pieces of time-series pixel data D1. Referring to FIG. 2, the "plurality of pieces of time-series pixel data having the different pixel positions respectively" stands for: time-series pixel data D1 of a first pixel; the time-series pixel data D1 of a second pixel; . . . ; the time-series pixel data D1 of an (M-1)th pixel; and time-series pixel data D1 of an Mth pixel.

The frequency component data, which has a frequency higher than the frequency of the frequency component data indicating the temperature change caused by the leaked gas and indicates high frequency noise, is defined as high frequency component data D3. The image processor 9 applies, to each of the plurality of pieces of time-series pixel data D1 constituting the moving image data MD, processing to remove the high frequency component data D3 in addition to the processing to remove the low frequency component data D2.

Thus, the image processor 9 does not apply, per frame, the processing to remove the low frequency component data D2 and the high frequency component data D3, but applies, per the time-series pixel data D1, the processing to remove the low frequency component data D2 and the high frequency component data D3.

Figure 5:
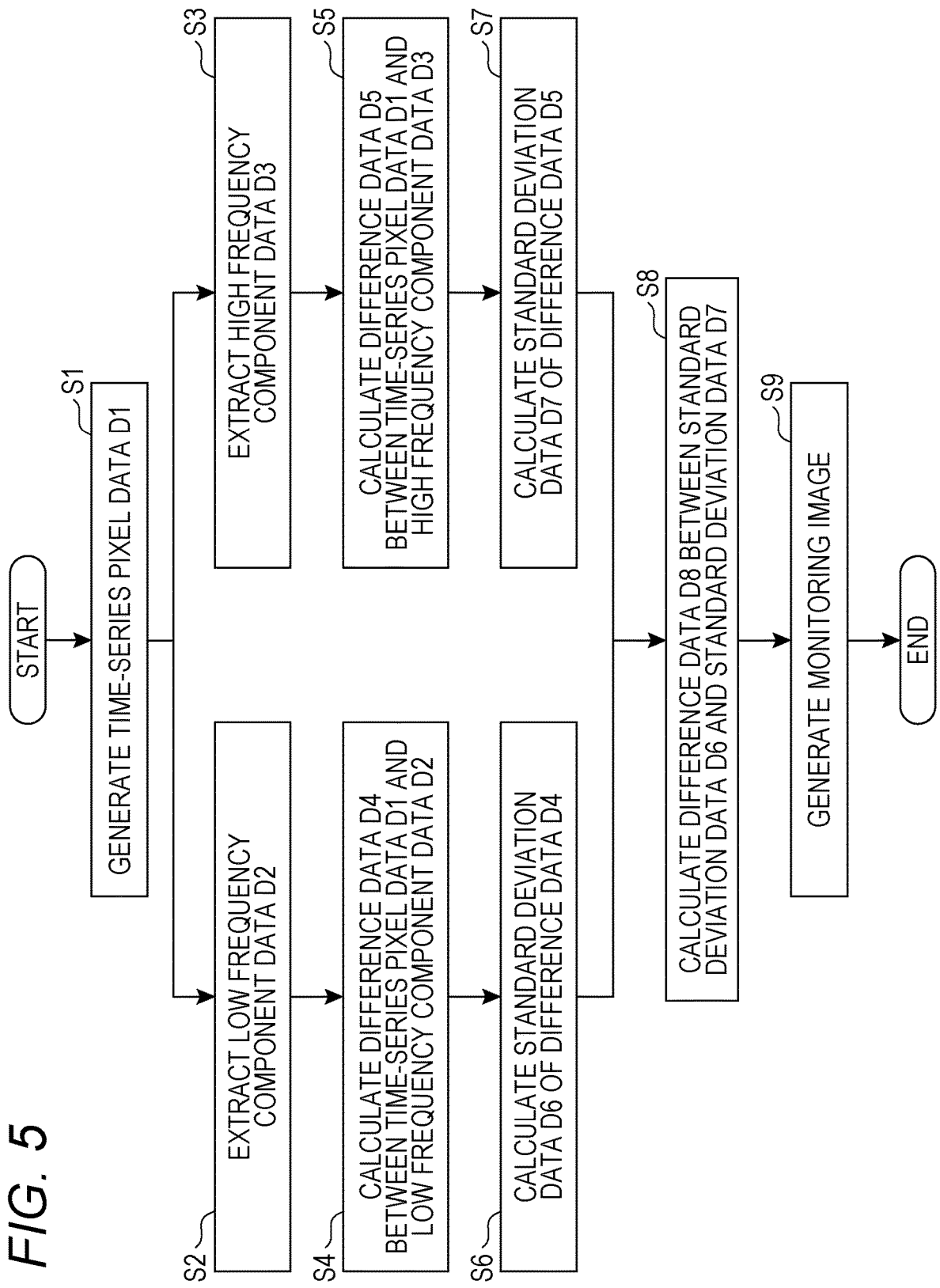
FIG. 5 is a flowchart illustrating generation processing of a monitoring image.

The gas-detection image processing device 3 generates a monitoring image by utilizing infrared images. In a case where gas leakage occurs, a monitoring image includes an image indicating a region where the gas appears due to the gas leakage. The gas-detection image processing device 3 detects the gas leakage based on the monitoring image. There are various methods of generating a monitoring image, but here, one exemplary method of generating a monitoring image will be described. The monitoring image is generated by utilizing infrared images including a monitoring object and a background. FIG. 5 is a flowchart illustrating generation processing of a monitoring image.

Referring to FIGS. 1A, 2, and 5, the image processor 9 generates M pieces of time-series pixel data D1 from moving image data MD (step S1).

The image processor 9 extracts M pieces of low frequency component data D2 respectively corresponding to the M pieces of time-series pixel data D1 while setting, as a piece of low frequency component data D2, a piece of data extracted from each piece of the time-series pixel data D1 by calculating, for each piece of time-series pixel data D1, a simple moving average per first predetermined number of frames fewer than K frames (step S2).

The first predetermined number of frames is, for example, twenty-one frames. Details of content are: a target frame; ten consecutive frames therebefore; and ten consecutive frames thereafter. The first predetermined number may be any number as far as it is possible to extract the low frequency component data D2 from the time-series pixel data D1, and may be more than twenty-one or less than twenty one, not limited to twenty-one.

The image processor 9 extracts M pieces of high frequency component data D3 respectively corresponding to the M pieces of time-series pixel data D1 while setting, as a piece of high frequency component data D3, a piece of data extracted from each piece of time-series pixel data D1 by calculating, for each piece of the time-series pixel data D1, a simple moving average per third predetermined number of frames (for example, three) fewer than the first predetermined number (for example, twenty-one) (step S3).

Figure 6:
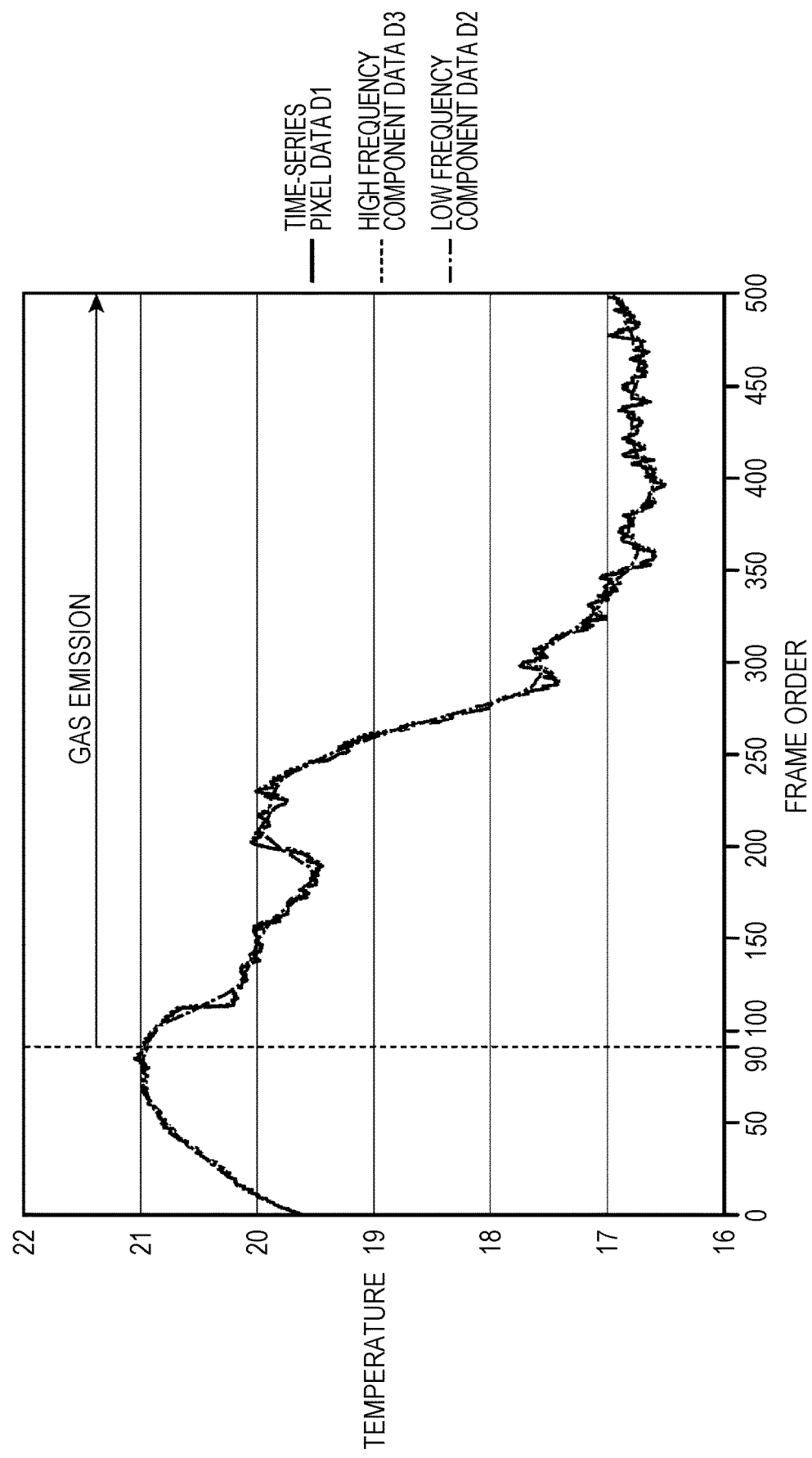
FIG. 6 is a graph illustrating time-series pixel data D1, low frequency component data D2 extracted from the time-series pixel data D1, and high frequency component data D3 extracted from the time-series pixel data D1 of a pixel corresponding to the point SP1 (FIG. 3).

FIG. 6 is a graph illustrating the time-series pixel data D1 of a pixel corresponding to the point SP1 (FIG. 4A), the low frequency component data D2 extracted from the time-series pixel data D1, and the high frequency component data D3 extracted from the time-series pixel data D1. A vertical axis and a horizontal axis of the graph are the same as the vertical axis and the horizontal axis of the graph of FIG. 4A. A temperature represented by the time-series pixel data D1 is changed relatively rapidly (a cycle of the change is relatively short), and a temperature indicated by the low frequency component data D2 is changed relatively slowly (a cycle of the change is relatively long). The high frequency component data D3 seems to substantially overlap with the time-series pixel data D1.

The third predetermined number of frames is, for example, three frames. Details of content are: a target frame; one frame immediately therebefore; and one frame immediately thereafter. The third predetermined number may be any number as far as it is possible to extract the third frequency component data from the time series pixel data, and the third predetermined number is not limited to three and may be more than three.

Referring to FIGS. 1A, 2, and 5, the image processor 9 calculates M pieces of difference data D4 respectively corresponding to the M pieces of time-series pixel data D1 while setting, as a piece of the difference data D4, a piece of data obtained by calculating a difference between a piece of the time-series pixel data D1 and a piece of the low frequency component data D2 extracted from this piece of time-series pixel data D1 (step S4).

The image processor 9 calculates M pieces of difference data D5 respectively corresponding to the M pieces of time-series pixel data D1 while setting, as a piece of the difference data D5, a piece of data obtained by calculating a difference between a piece of the time-series pixel data D1 and a piece of the high frequency component data D3 extracted from this piece of time-series pixel data D1 (step S5).

Figure 7A:
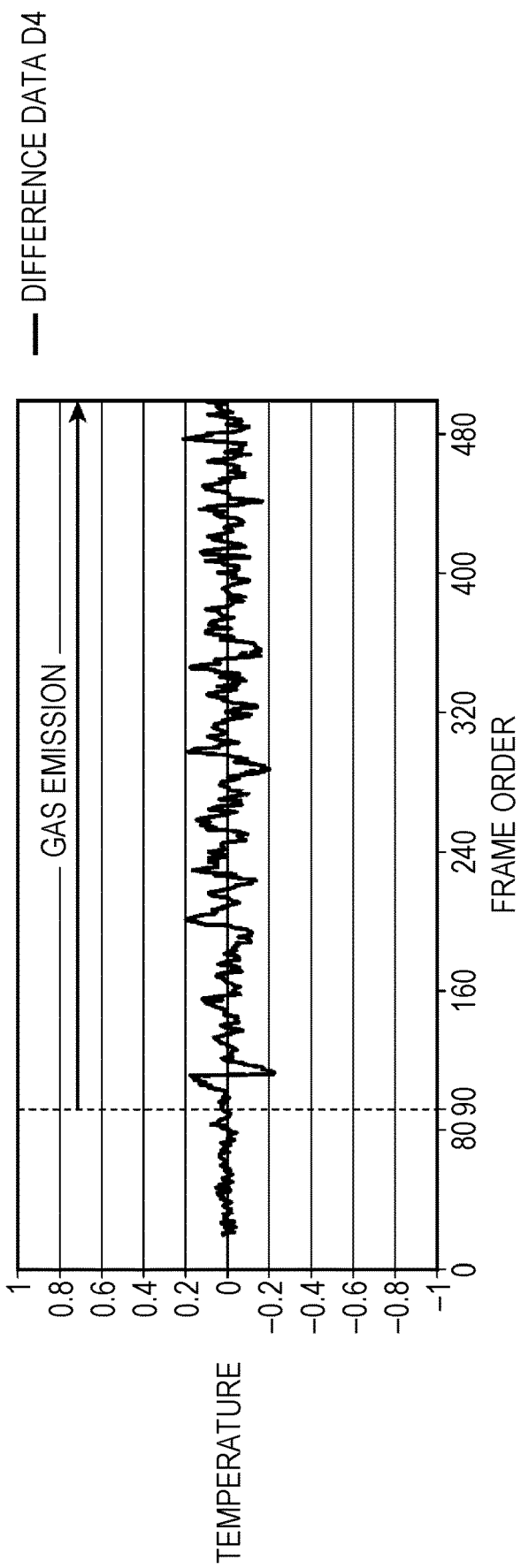
FIG. 7A is a graph illustrating difference data D4.
Figure 7B:
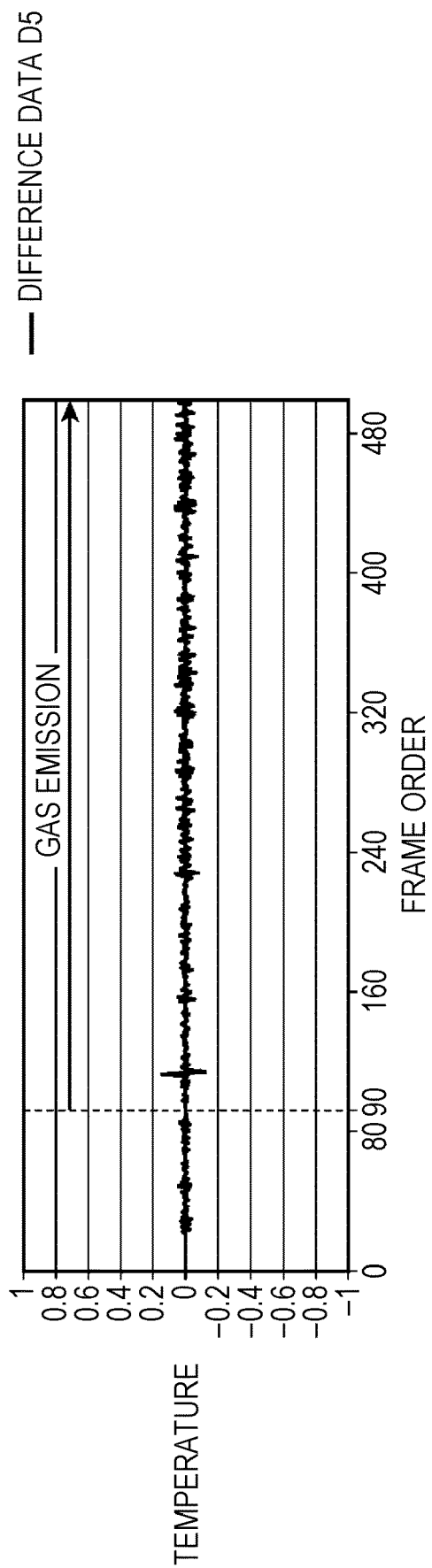
FIG. 7B is a graph illustrating difference data D5.

FIG. 7A is a graph illustrating the difference data D4, and FIG. 7B is a graph illustrating the difference data D5. A vertical axis and a horizontal axis in each of these graphs are the same as the vertical axis and the horizontal axis of the graph of FIG. 4A. The difference data D4 is data obtained by calculating the difference between the time-series pixel data D1 and the low frequency component data D2 which are illustrated in FIG. 6. Before gas emission is started at the point SP1 illustrated in FIG. 4A (in frames up to about 90th frame), repetition of minute amplitude indicated by the difference data D4 mainly represents sensor noise of the two-dimensional image sensor 6. After the gas emission is started at the point SP1 (in 90th and subsequent frames), variation in the amplitude and variation in a waveform of the difference data D4 are increased.

The difference data D5 is data obtained by calculating the difference between the time-series pixel data D1 and the high frequency component data D3 illustrated in FIG. 6.

The difference data D4 includes: the frequency component data indicating the temperature change caused by the leaked gas; and the high frequency component data D3 (data indicating the high frequency noise). The difference data D5 does not include the frequency component data indicating the temperature change caused by the leaked gas, but includes the high frequency component data D3.

Since the difference data D4 includes the frequency component data indicating the temperature change caused by the leaked gas, the variation in the amplitude and the variation in the waveform of the difference data D4 is increased after the gas emission is started at the point SP1 (90th and subsequent frames). On the other hand, such situations do not occur in the difference data D5 because the difference data D5 does not include the frequency component data indicating the temperature change caused by the leaked gas. The difference data D5 repeats minute amplitude. This is the high frequency noise.

The difference data D4 and the difference data D5 are correlated to each other but are not completely correlated. In other words, in a certain frame, a value of the difference data D4 may be positive and a value of the difference data D5 may be negative, or vice versa. Therefore, the high frequency component data D3 cannot be removed by calculating a difference between the difference data D4 and the difference data D5. To remove the high frequency component data D3, it is necessary to convert the difference data D4 and the difference data D5 into values such as absolute values that can be subtracted one from the other.

Hence, the image processor 9 calculates M pieces of standard deviation data D6 respectively corresponding to the M pieces of time-series pixel data D1 while setting, as a piece of standard deviation data D6, a piece of data obtained by calculating, for each piece of difference data D4, a moving standard deviation per second predetermined number of frames fewer than K frames (step S6). Note that movement variance may be calculated instead of the movement standard deviation.

Furthermore, the image processor 9 calculates M pieces of standard deviation data D7 respectively corresponding to the M pieces of time-series pixel data D1 while setting, as a piece of the standard deviation data D7, a piece of data obtained by calculating, for each piece of difference data D5, a movement standard deviation per fourth predetermined number of frames (for example, twenty-one) fewer than the K frames (step S7). Moving variance may be used instead of moving standard deviation.

Figure 8:
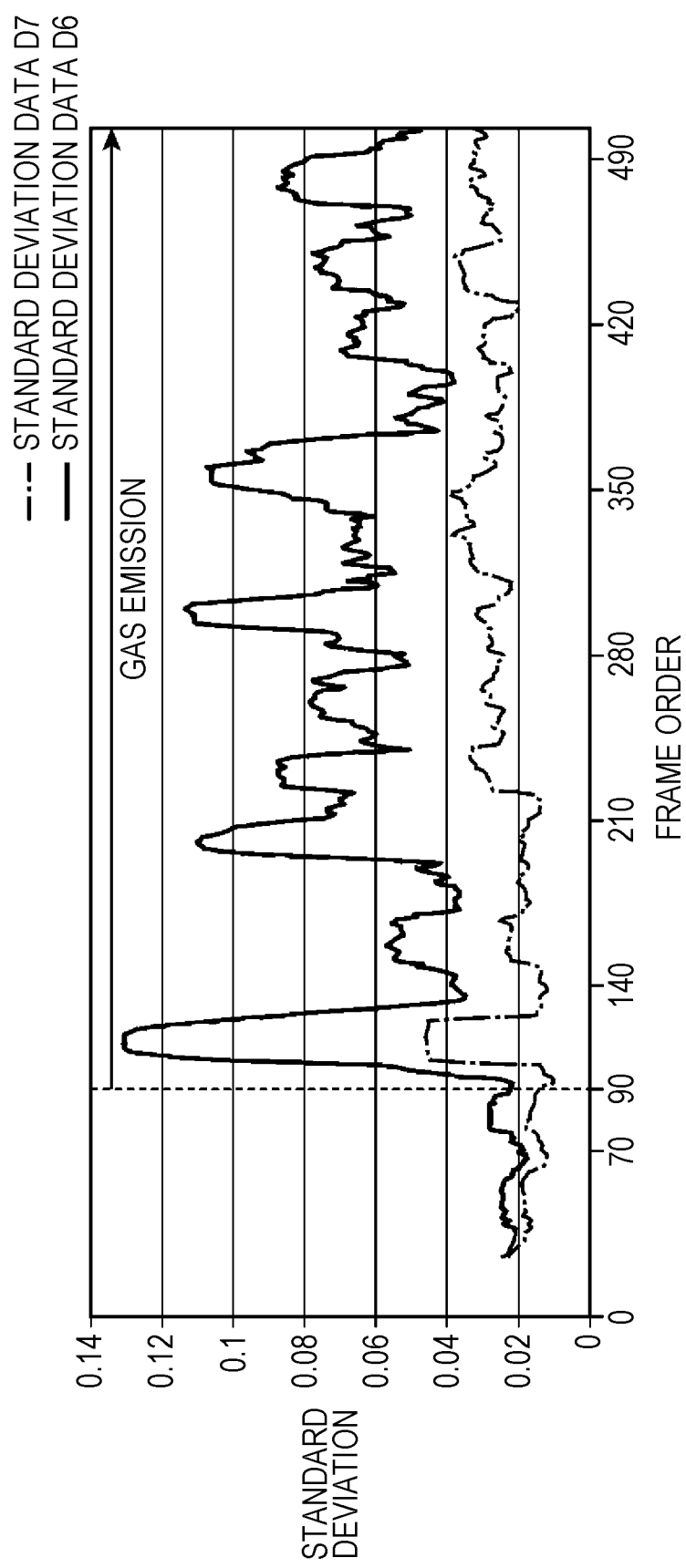
FIG. 8 is a graph illustrating standard deviation data D6 and standard deviation data D7.

FIG. 8 is a graph illustrating the standard deviation data D6 and the standard deviation data D7. A horizontal axis of the graph is the same as the horizontal axis of the graph in FIG. 4A. A vertical axis of the graph represents the standard deviation. The standard deviation data D6 is data indicating the movement standard deviation of the difference data D4 illustrated in FIG. 7A. The standard deviation data D7 is data indicating the movement standard deviation of the difference data D5 illustrated in FIG. 7B. The number of frames used in calculating the movement standard deviation is twenty-one for both of the standard deviation data D6 and the standard deviation data D7, but the number of frames is not limited to twenty-one and may be any number as far as it is possible obtain a statistically significant standard deviation.

The standard deviation data D6 and the standard deviation data D7 do not include negative values because both are standard deviations. Therefore, the standard deviation data D6 and the standard deviation data D7 can be deemed as data converted such that subtraction can be executed between the difference data D4 and the difference data D5.

The image processor 9 calculates M pieces of difference data D8 respectively corresponding to the M pieces of time-series pixel data D1 while setting, as a piece of the difference data D8, a piece of data obtained by calculating a difference between a piece of the standard deviation data D6 and a piece of the standard deviation data D7 which are obtained from the same piece of the time-series pixel data D1 (step S8).

Figure 9:
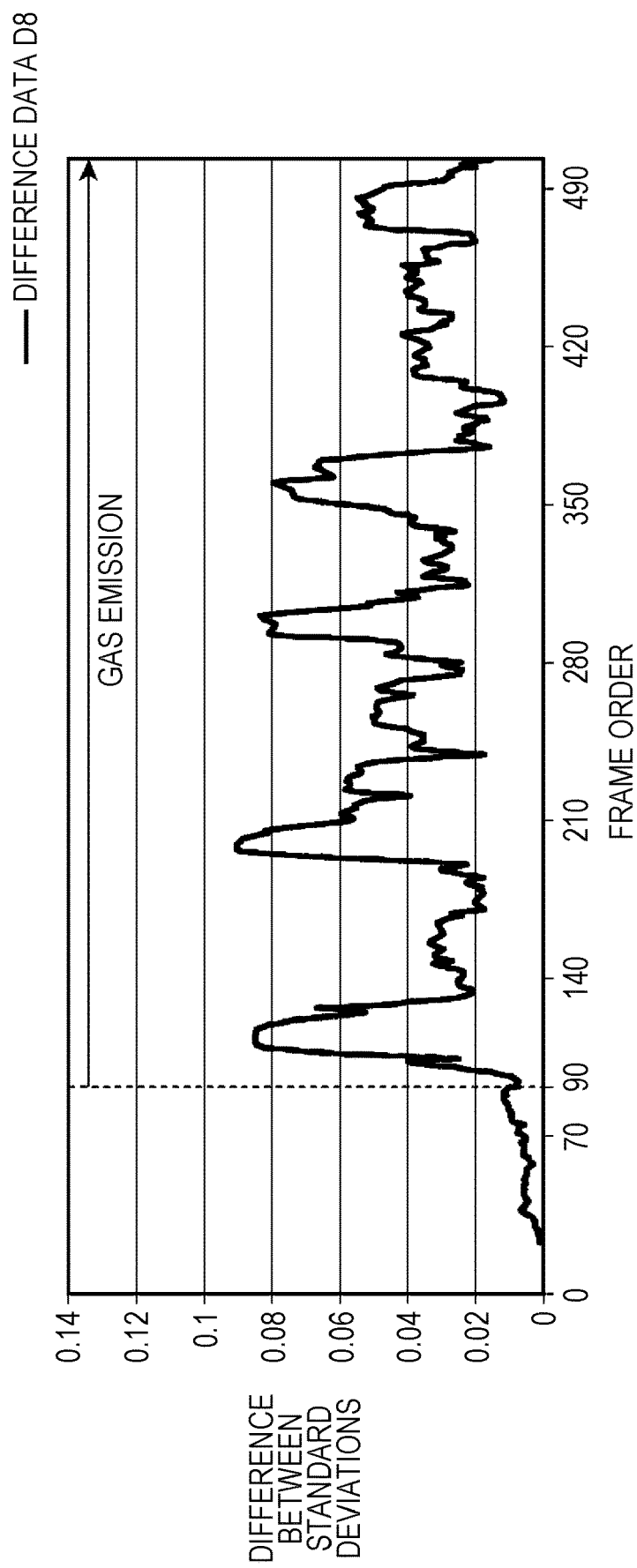
FIG. 9 is a graph illustrating difference data D8.

FIG. 9 is a graph illustrating the difference data D8. A horizontal axis of the graph is the same as the horizontal axis of the graph in FIG. 4A. A vertical axis of the graph is the difference in the standard deviation. The difference data D8 is data indicating a difference between the standard deviation data D6 and the standard deviation data D7 illustrated in FIG. 8. The difference data D8 is data that has been applied with the processing to remove the low frequency component data D2 and the high frequency component data D3.

The image processor 9 generates a monitoring image (step S9). In other words, the image processor 9 generates a moving image including the M pieces of difference data D8 obtained in step S8. Each of the frames constituting this moving image is a monitoring image. The monitoring image is an image obtained by visualizing the difference in the standard deviation. The image processor 9 outputs, to the display control unit 10, the moving image obtained in step S9. The display control unit 10 causes the display 11 to display this moving image. As monitoring images included in this moving image, there are an image I12 illustrated in FIG. 10 and an image I15 illustrated in FIG. 11, for example.

Figure 10:
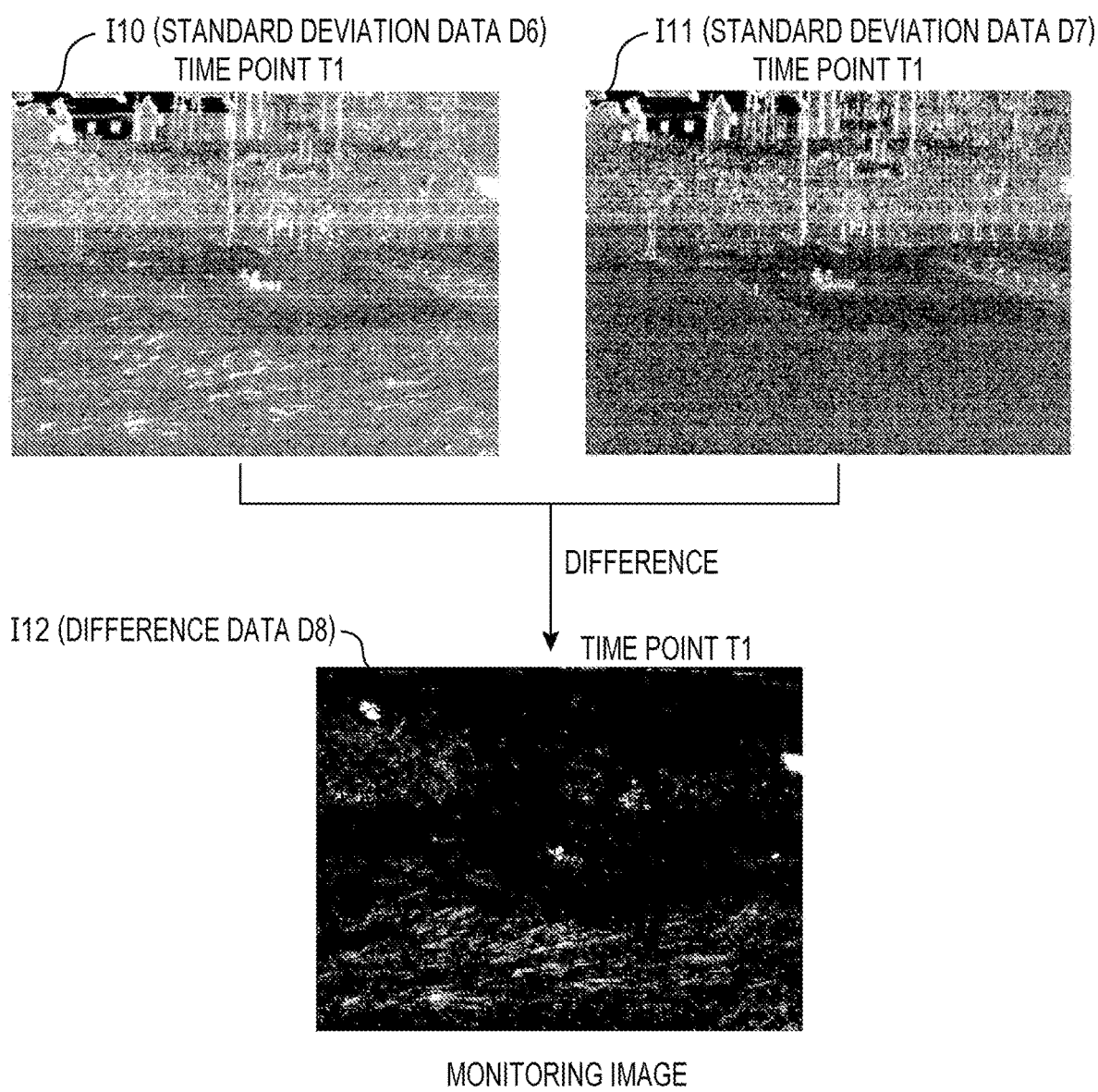
FIG. 10 provides image views illustrating an image I10, an image I11, and an image I12 generated based on a frame at a time point T1.

FIG. 10 provides image views illustrating an image I10, an image I11, and the image I12 generated based on a frame at the time point T1. The image I10 is an image of the frame at the time point T1 in the moving image represented by the M pieces of standard deviation data D6 obtained in step S6 of FIG. 5. The image I11 is an image of the frame at the time point T1 in the moving image represented by the M pieces of standard deviation data D7 obtained in step S7 of FIG. 5. A difference between the image I10 and the image I11 is to be the image I12 (monitoring image).

Figure 11:
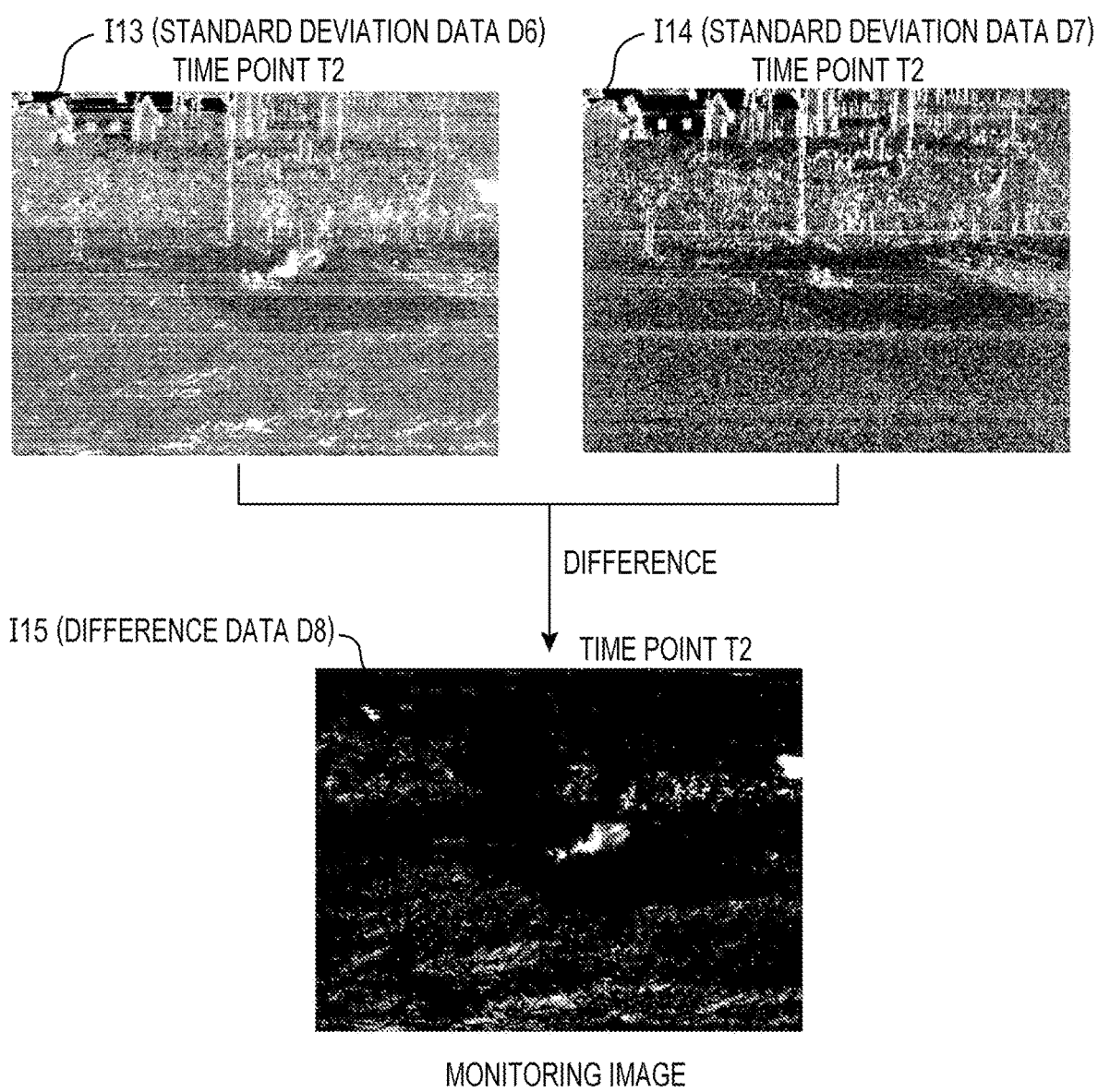
FIG. 11 provides image views illustrating an image I13, an image I14, and an image I15 generated based on a frame at a time point T2.

FIG. 11 provides image views illustrating an image I13, an image I14, and the image I15 generated based on a frame at the time point T2. The image I13 is an image of a frame at the time point T2 in the moving image represented by the M pieces of standard deviation data D6 obtained in step S6. The image I14 is an image of a frame at a time point T2 in the moving image represented by the M pieces of standard deviation data D7 obtained in step S7. A difference between the image I13 and the image I14 is to be the image I15 (monitoring image). All of the images I10 to I15 illustrated in FIGS. 10 and 11 are images obtained by enlarging the standard deviation 5000 times.

Since the image I12 illustrated in FIG. 10 is the image captured before the gas is emitted from the point SP1 illustrated in FIG. 4A, a state in which the gas comes out from the point SP1 does not appear in the image I12. On the other hand, since the image I15 illustrated in FIG. 11 is an image captured at the time point in which the gas is emitted from the point SP1, the state in which the gas comes out from the point SP1 appears in the image I15.

As described above, according to the embodiment, the image processor 9 (FIG. 1A) generates the moving image data by applying the processing to remove low frequency component data D2 included in the moving image data MD of the infrared images, and the display control unit 10 causes the display 11 to display the moving image (the moving image of the monitoring images) represented by the moving image data. Accordingly, according to the embodiment, the state of the gas leakage can be displayed as the moving image of the monitoring images even in a case where the gas leakage and the background temperature change occur in parallel and the background temperature change is larger than the temperature change caused by the leaked gas.

The higher the temperature is, the smaller the sensor noise is, and therefore, the sensor noise is varied in accordance with the temperature. In the two-dimensional image sensor 6 (FIG. 1A), noise in accordance with the temperature sensed by the pixel is generated in each pixel. In other words, noise is not the same in all of the pixels. According to the embodiment, since the high frequency noise can be removed from the moving image, even slight gas leakage can be displayed on the display 11.

In the embodiment, with execution in steps S100 to S103 illustrated in FIG. 12, it is possible to identify whether a gas candidate is a gas that constantly comes out from the same position or a gaseous substance that is flowing. FIG. 12 is a flowchart to describe image processing executed in the embodiment to identify these. Comparing an event in which the gas constantly comes out from the same position with an event in which the gaseous substance is flowing, this image processing will be described.

Figure 13A:
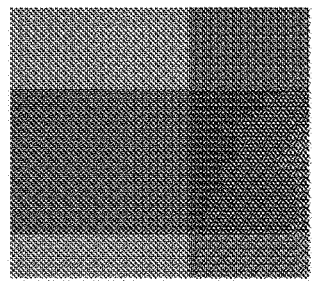
FIG. 13A is an image view illustrating an infrared image relating to an event in which the gaseous substance is flowing.
Figure 13B:
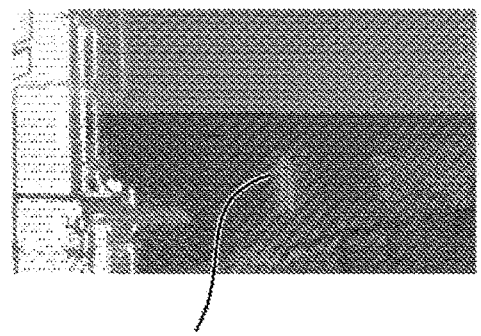
FIG. 13B is an image view illustrating an infrared image relating to an event in which the gas constantly comes out from the same position.

FIG. 13A is an image view illustrating an infrared image Im0-1 relating to the event in which the gaseous substance is flowing. The gaseous substance is cloud, and the background is sky. In FIG. 13A, not an entire portion of the infrared image Im0-1 but only a rectangle portion including the cloud and a periphery thereof out of the infrared image Im0-1 is illustrated. Since a difference between a temperature of the cloud and a temperature of the background is little, an image of the cloud is vaguely shown. FIG. 13B is an image view illustrating an infrared image Im0-2 relating to the event in which the gas constantly comes out from the same position. In FIG. 13B, not an entire portion of the infrared image Im0-2 but only a rectangular portion including a tower image 101 out of the infrared image Im0-2 is illustrated. In this portion, the gas that constantly comes out from the same position appears. Since the difference between a temperature of the gas and the temperature of the background is little, an image of the gas is vaguely shown.

The first processor 91 illustrated in FIG. 1A generates a moving image of monitoring images by using moving image data MD including a plurality of infrared images Im0 (frames) each including the image of the gas that constantly comes out from the same position (FIG. 13B) (step S100 in FIG. 12). More specifically, the first processor 91 applies, to the moving image data MD, the processing in steps S1 to S9 illustrated in FIG. 5. Consequently, the respective frames constituting the moving image are converted from the infrared images Im0 to the monitoring images, and the moving image of the monitoring images is generated. The monitoring image is, for example, the image I12 illustrated in FIG. 10 and the image I15 illustrated in FIG. 11. In a case where any gas candidate appears, a gas candidate region indicating a region where the gas candidate appears is included in each monitoring image. An image of the gas that constantly comes out from the same position may be a gas candidate region, or an image of the gaseous substance that is flowing may also be a gas candidate region. The image I15 is an image captured in 2 seconds after the start of gas emission. A white region located near a center of the image I15 is the gas candidate region. Here, the gas candidate region is the image of the gas that constantly comes out from the same position.

Figure 14:
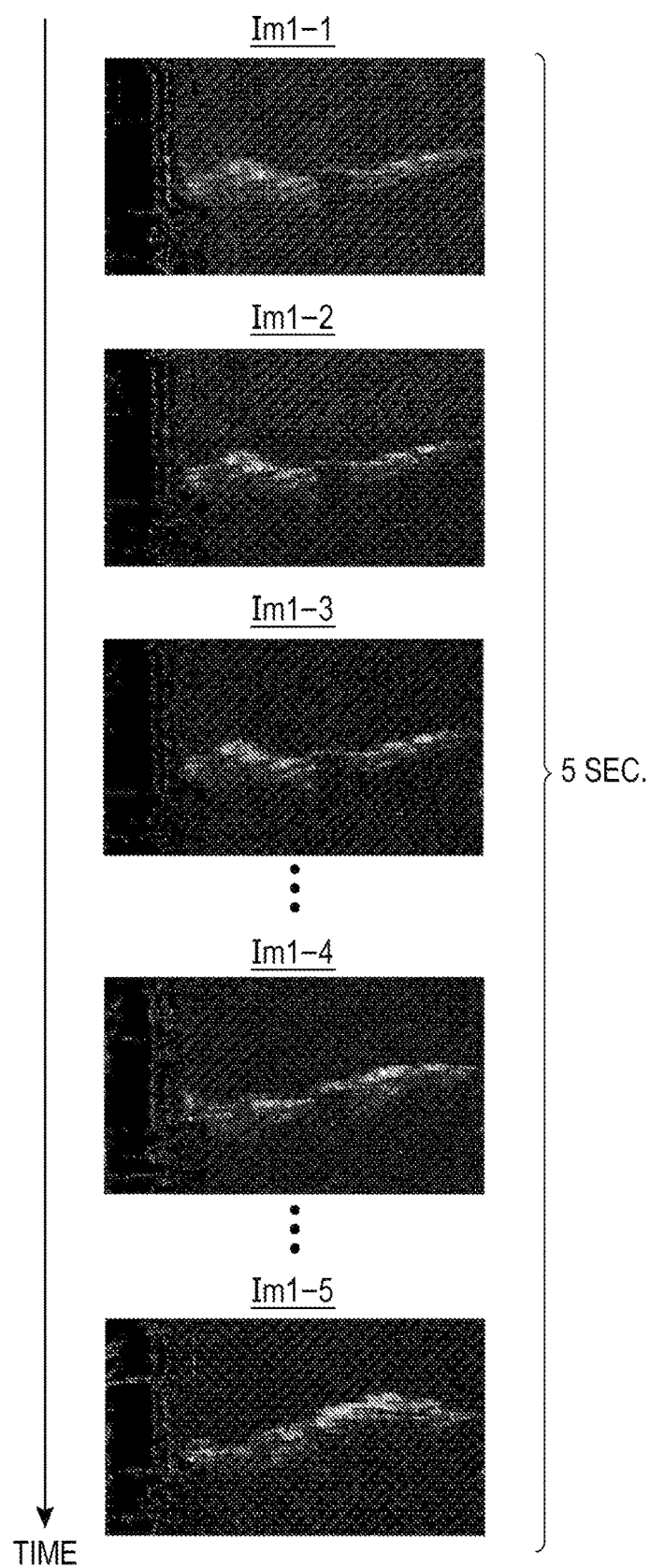
FIG. 14 is an image view illustrating a frame group constituting a moving image of monitoring images generated by using moving image data including infrared images (frames) each including an image of the gas that constantly comes out from the same position.

FIG. 14 is an image view illustrating a frame group constituting a moving image of monitoring images generated by using the moving image data MD including infrared images Im0 (frames) each including the image of the gas that constantly comes out from the same position (FIG. 13B). This frame group corresponds to a 5-second moving image. Since the frame rate is 30 fps, the number of frames constituting the frame group is one hundred fifty.

Each frame (monitoring image) is to be a first image Im1. In FIG. 14, not an entire portion of each of first images Im1 but a portion of each of the first images Im1 corresponding to the infrared image Im0-2 illustrated in FIG. 13B is illustrated. In the 5-second moving image, a first image Im1-1 is a first frame, a first image Im1-2 is a second frame, a first image Im1-3 is a third frame, a first image Im1-4 is a kth frame (3<k<150), and a first image Im1-5 is a 150th frame (final frame). In each of the first images Im1, a gas candidate region is indicated in white and gray.

Similarly, the first processor 91 generates a moving image of monitoring images by using moving image data MD including the plurality of infrared images Im0 (frames) each including the image of the gaseous substance that is flowing (FIG. 13A). Images representing this frame group constituting this moving image are not illustrated.

In the embodiment, a gas candidate region is obtained in the processing from step S1 to step S9 illustrated in FIG. 5, but a known technology of obtaining a gas candidate region by applying image processing to infrared images (for example, image processing disclosed in Patent Literature 1) may also be used.

As described above, the first processor 91 generates the plurality of first images Im1 by applying the processing to extract a gas candidate region to each of the plurality of infrared images Im0 captured in time series.

Next, extraction of a first appearance region will be described (step S101 in FIG. 12). The first appearance region is a region indicating that a gas candidate region has appeared in at least a part of the first predetermined period. The description will be provided by setting the first predetermined period to 5 seconds, but the first predetermined period is not limited thereto. The second processor 92 illustrated in FIG. 1A generates a second image Im2 including a first appearance region based on two or more of the first images Im1 corresponding to the first predetermined period out of the plurality of first images Im1 (here, one hundred fifty frames) generated by the first processor 91.

Figure 15A:
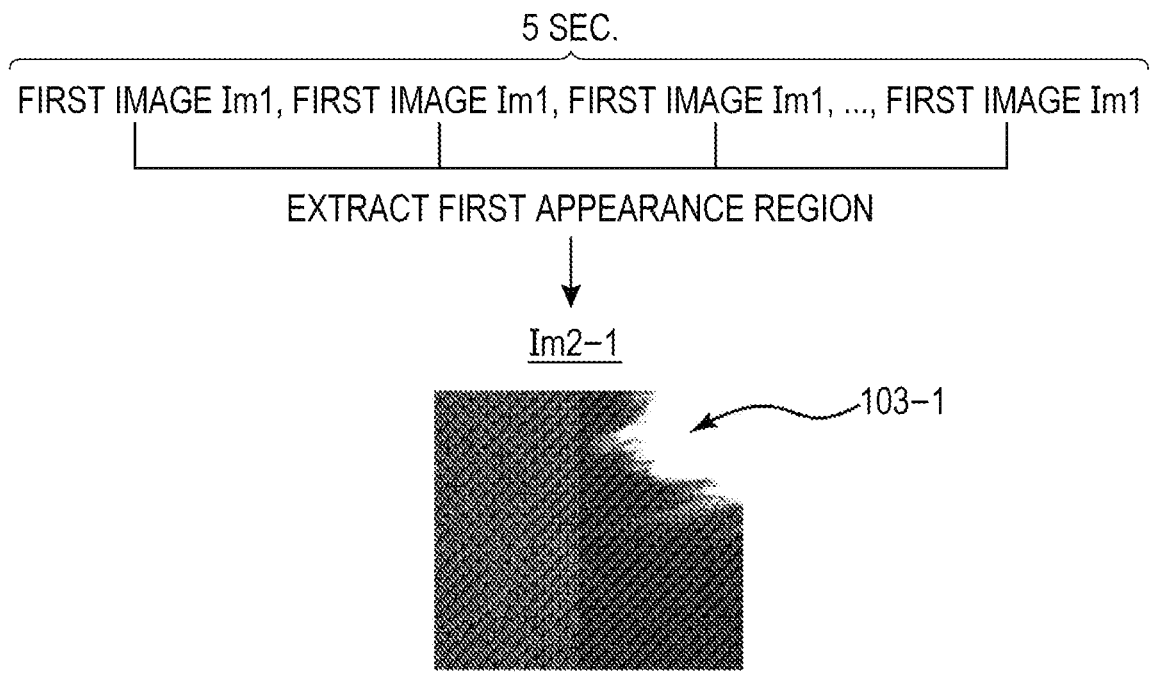
FIG. 15A is an image view illustrating a second image relating to the event in which the gaseous substance is flowing.

FIG. 15A is an image view illustrating a second image Im2-1 relating to the event in which the gaseous substance is flowing. In FIG. 15A, not an entire portion of the second image Im2-1 but a portion of the second image Im2-1 corresponding to the infrared image Im0-1 illustrated in FIG. 13A is illustrated. Two or more of first images Im1 used to generate the second images Im2-1 are not illustrated, but are the two or more of first images Im1 generated by using the moving image data MD of the infrared images Im0 each including the image of the gaseous substance that is flowing (FIG. 13A). A white region and a gray region included in FIG. 15A correspond to a first appearance region 103-1.

Figure 15B:
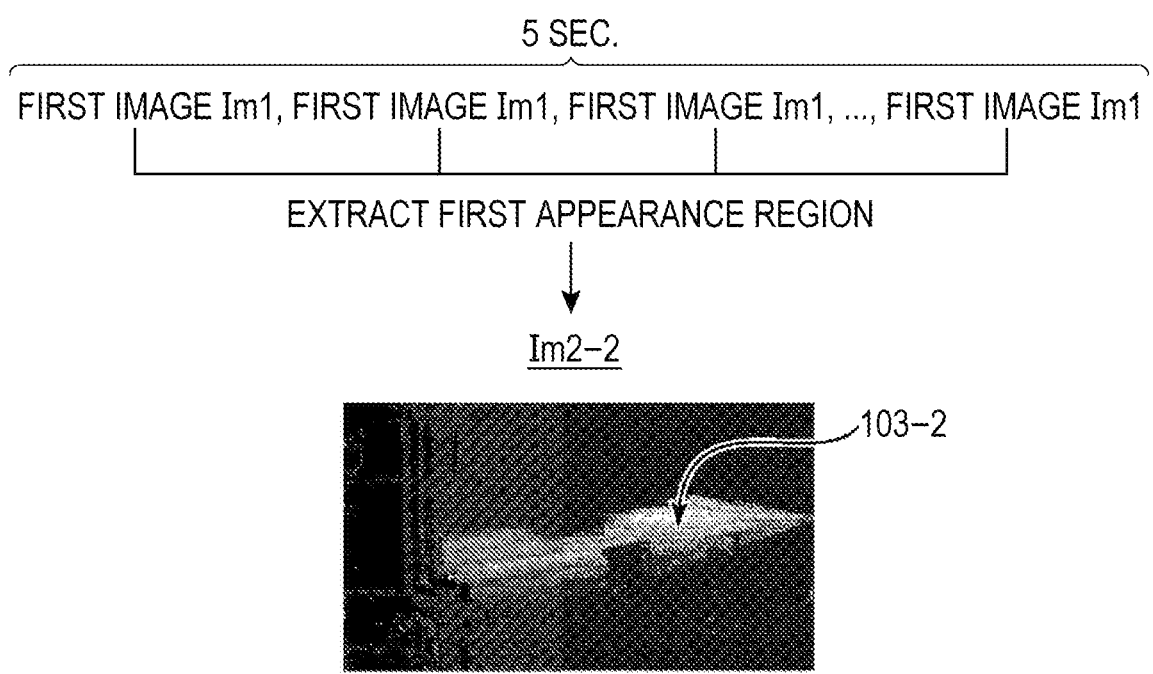
FIG. 15B is an image view illustrating a second image relating to the event in which the gas constantly comes out from the same position.

FIG. 15B is an image view illustrating a second image Im2-2 relating to the event in which the gas constantly comes out from the same position. In FIG. 15B, not an entire portion of the second image Im2-2 but a portion of the second image Im2-2 corresponding to the infrared image Im0-2 illustrated in FIG. 13B is illustrated. Two or more of first images Im1 used to generate the second images Im2-2 is the first images Im1 corresponding to 5 seconds illustrated in FIG. 14. These are the two or more of first images Im1 generated by using the moving image data MD of the infrared images Im0 each including the image of the gas that constantly comes out from the same position (FIG. 13B). A white region and a gray region included in FIG. 15B correspond to a first appearance region 103-2.

An exemplary method of generating a second image Im2 (in other words, a method of extracting a first appearance region 103) will be described. The second processor 92 determines, from among pixels located in the same order in two or more of first images Im1 (for example, the first images Im1 corresponding to 5 seconds illustrated in FIG. 14), a maximum value of values indicated by the pixels (here, a difference between standard deviations). The second processor 92 sets this maximum value as a value of a pixel located in the mentioned order of each second image Im2. More specifically, the second processor 92 determines a maximum value of values indicated by first pixels in the two or more of first images Im1, and sets this value as a value of a first pixel in the second image Im2. The second processor 92 determines a maximum value of values indicated by second pixels in the two or more of first images Im1, and sets this value as a value of a second pixel of the second image Im2. The second processor 92 applies the similar processing to third and subsequent pixels.

Thus, when the values of the pixels constituting the second image Im2 are determined, a first appearance region 103 is extracted, and the first appearance region 103 is included in the second image Im2.

The second processor 92 generates, for each of the plurality of first predetermined periods (5 seconds), a second image Im2 relating to the event in which the gaseous substance is flowing, and also generates, for each of the plurality of first predetermined periods (5 seconds), a second image Im2 relating to the event in which the gas constantly comes out from the same position. Here, three first predetermined periods will be described as an example.

Figure 16A:
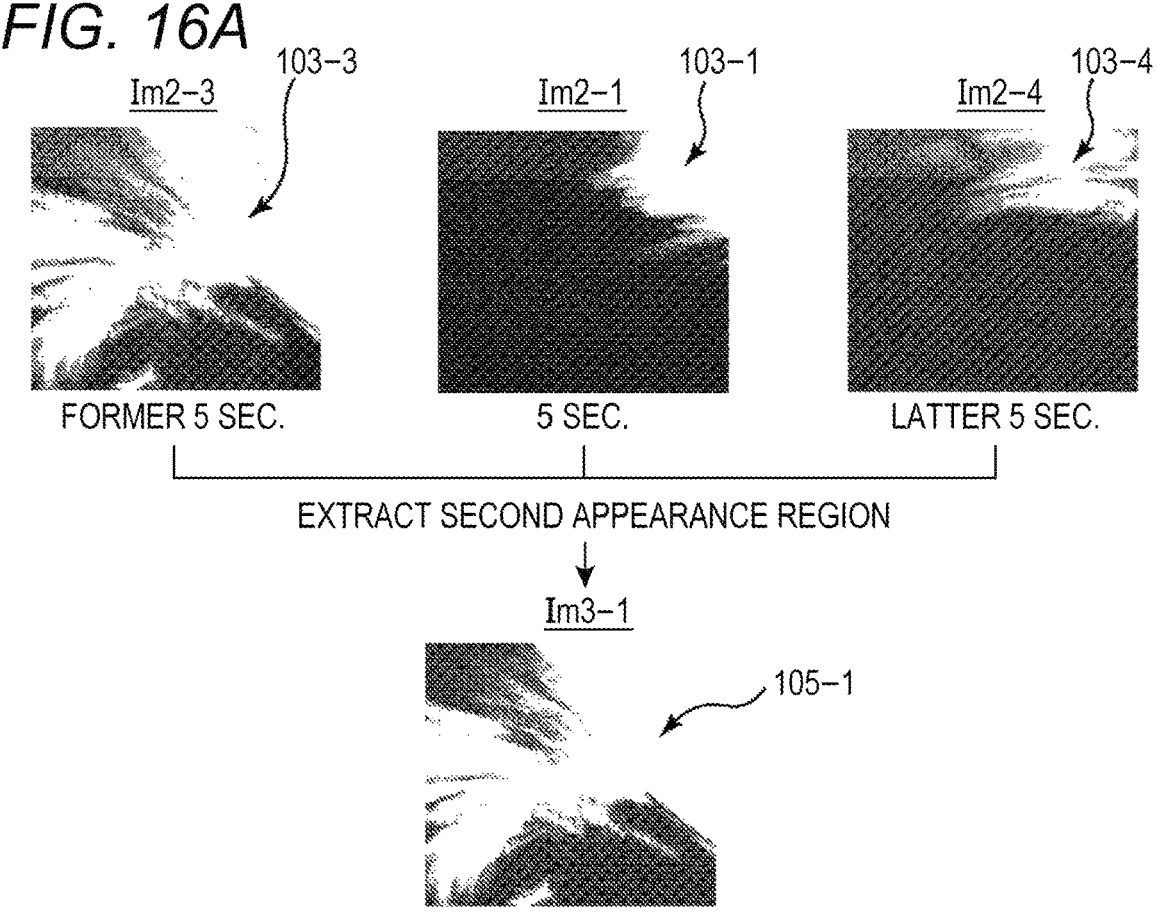
FIG. 16A provides image views illustrating three second images and a third image generated based on these second images relating to the event in which the gaseous substance is flowing.

The second processor 92 generates a second image Im2 based on two or more of first images Im1 constituting a former 5-second moving image before a 5-second moving image including the two or more of the first images Im1 used to generate the second image Im2-1 illustrated in FIG. 15A, and also generates a second image Im2 based on two or more of first images Im1 constituting a latter 5-second moving image. These 5-second periods are three first predetermined periods. FIG. 16A provides image views illustrating three second images Im2-3, Im2-1, Im2-4, and a third image Im3-1 generated based on these. In FIG. 16A, not entire portions of the second image Im2-3, Im2-1, Im2-4, and the third image Im3-1 but portions of these images corresponding to the infrared image Im0-1 illustrated in FIG. 13A are illustrated. The second image Im2-3 includes a first appearance region 103-3, the second image Im2-1 includes the first appearance region 103-1, and the second image Im2-4 includes a first appearance region 103-4. The first appearance regions 103 are illustrated in white and gray.

Figure 16B:
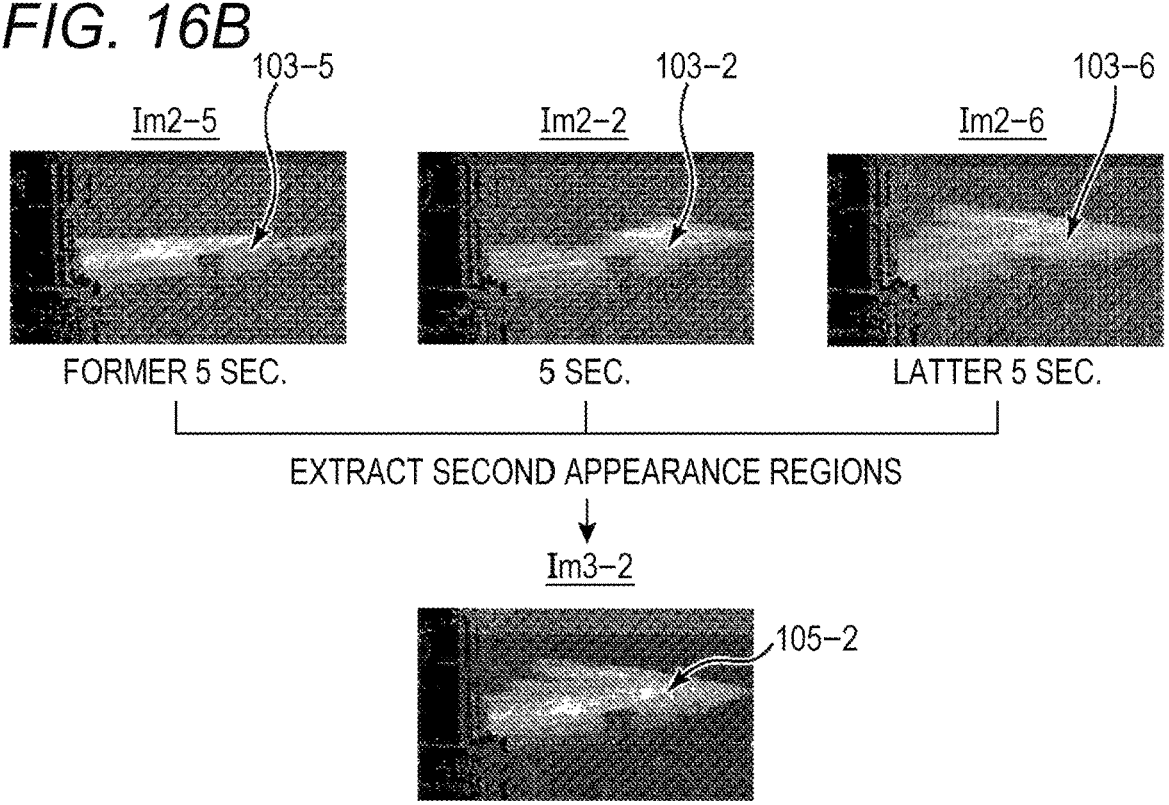
FIG. 16B provides image views illustrating three second images and a third image generated based on these second images relating to the event in which the gas constantly comes out from the same position.

The second processor 92 generates a second image Im2 based on two or more of first images Im1 constituting a former 5-second moving image before a 5-second moving image including the two or more first images Im1 used to generate the second image Im2-2 illustrated in FIG. 15B, and also generates a second image Im2 based on two or more of first images Im1 constituting a latter 5-second moving image. FIG. 16B provides image views illustrating three second images Im2-5, Im2-2, Im2-6, and a third image Im3-2 generated based on these. In FIG. 16B, not entire portions of the second image Im2-5, Im2-2, Im2-6, and the third image Im3-2 but portions of these images corresponding to the infrared image Im0-2 illustrated in FIG. 13B are illustrated. The second image Im2-5 includes a first appearance region 103-5, the second image Im2-2 includes the first appearance region 103-2, and the second image Im2-6 includes a first appearance region 103-6. The first appearance regions 103 are illustrated in white and gray.

In the examples illustrated in FIGS. 16A and 16B, the three first predetermined periods may be continuous or may not be continuous. In either case, a first appearance region 103 is to be included in each second image Im2. The example in which the predetermined periods are continuous will be described using FIG. 16A. The second processor 92 generates, out of a 15-second moving image, the second image Im2-3 by using two or more of first images Im1 constituting the moving image from 1 to 5 seconds, generates the second image Im2-1 by using two or more of first images Im1 constituting a moving image from 6 to 10 seconds, and generates the second image Im2-4 by using two or more of first images Im1 constituting a moving image from 11 to 15 seconds. The example in which the predetermined periods are not continuous will be described. The second processor 92 generates, out of a 25-second moving image, the second image Im2-3 by using the two or more of first images Im1 constituting the moving image from 1 to 5 seconds, generates the second image Im2-1 by using two or more of first images Im1 constituting a moving image from 11 to 15 seconds, and generates the second image Im2-4 by using two or more of first images Im1 constituting a moving image from 21 to 25 seconds.

Lengths of the three first predetermined periods are the same in the examples illustrated in FIGS. 16A and 16B, but as far as a first appearance region 103 is included in each second image Im2, the lengths are not limited thereto. This will be described using FIG. 16A. The first predetermined period (for example, 10 seconds) corresponding to the two or more of first images Im1 used to generate the second image Im2-1 is set longer than the first predetermined period (for example, 5 seconds) corresponding to the two or more of the first images Im1 used to generate the second image Im2-3 and the first predetermined period (for example, 5 seconds) corresponding to the two or more of first images Im1 used to generate the second image Im2-4.

Next, extraction of a second appearance region will be described (step S102 in FIG. 12). The second appearance region is a region indicating that a gas candidate region has appeared in at least a part of a second predetermined period. The description will be provided while setting the second predetermined period to 15 seconds, but the second predetermined period is not limited thereto. The third processor 93 illustrated in FIG. 1A generates a third image Im3 including a second appearance region 105 based on three second images Im2. As it can be found from the description below, this corresponds to that: the third processor 93 generates the third image Im3 including the second appearance region 105 based on two or more of first images Im1 corresponding to the second predetermined period (15 seconds) different from the first predetermined period, out of the plurality of first images Im1.

Referring to FIG. 16A, the third processor 93 illustrated in FIG. 1A generates the third image Im3-1 including a second appearance region 105-1 while using the second images Im2-3, Im2-1, and Im2-4 by applying processing to extract the second appearance region 105-1. A white region and a gray region included in FIG. 16A correspond to the second appearance regions 105-1.

Referring to FIG. 16B, the third processor 93 illustrated in FIG. 1A generates the third image Im3-2 including a second appearance region 105-2 while using the second images Im2-5, Im2-2, and Im2-6 by applying processing to extract the second appearance region 105-2. A white region and a gray region included in FIG. 16B correspond to the second appearance region 105-2.

An exemplary method of generating a third image Im3 (in other words, a method of extracting a second appearance region 105) will be described. The third processor 93 determines, from among pixels located in the same order in three second images Im2, a maximum value of values indicated by the pixels. The third processor 93 sets this maximum value as a value of a pixel located in the mentioned order of a third image Im3. More specifically describing with reference to FIG. 16A, the third processor 93 determines the maximum value of the values indicated by first pixels in the second images Im2-3, Im2-1, and Im2-4, and sets this value as a value of a first pixel of the third image Im3-1. The third processor 93 determines a maximum value of values indicated by values indicated by second pixels in the second image Im2-3, Im2-1, and Im2-4, and sets this value as a value of a second pixel of the third image Im3-1. The third processor 93 applies the similar processing to the third and subsequent pixels.

The third image Im3 thus generated results same as the generation processing of the third image Im3 including the second appearance region 105 based on the two or more of first images Im1 corresponding to the second predetermined period (15 seconds) (the same second appearance region 105 is extracted). This will be described using FIG. 16A. The second processor 92 generates the second image Im2-3 while setting, as a value of a pixel located on the same order of the second image Im2-3, a maximum value of values indicated by pixels located in the same order in the two or more of first images Im1 corresponding to the first predetermined period (former 5 seconds), generates the second image Im2-1 while setting, as a value of a pixel located on the same order of the second image Im2-1, a maximum value of values indicated by pixels located in the same order of the two or more of first images Im1 corresponding to the first predetermined period (5 seconds), and generates the second image Im2-4 while setting, as a value of a pixel located on the same order of the second image Im2-4, a maximum value of values indicated by pixels located in the same order of the two or more of first images Im1 corresponding to the first predetermined period (latter 5 seconds). The third processor 93 generates the third image Im3-1 in the above-described method while using the second images Im2-3, Im2-1, and Im2-4. The above-described processing is the same as the processing to set, as the value of the pixel located on the same order of the third image Im3-1, the maximum value of the values indicated by the pixels located on the same order in the two or more of first images Im1 corresponding to the second predetermined period (15 seconds).

Figure 17A:
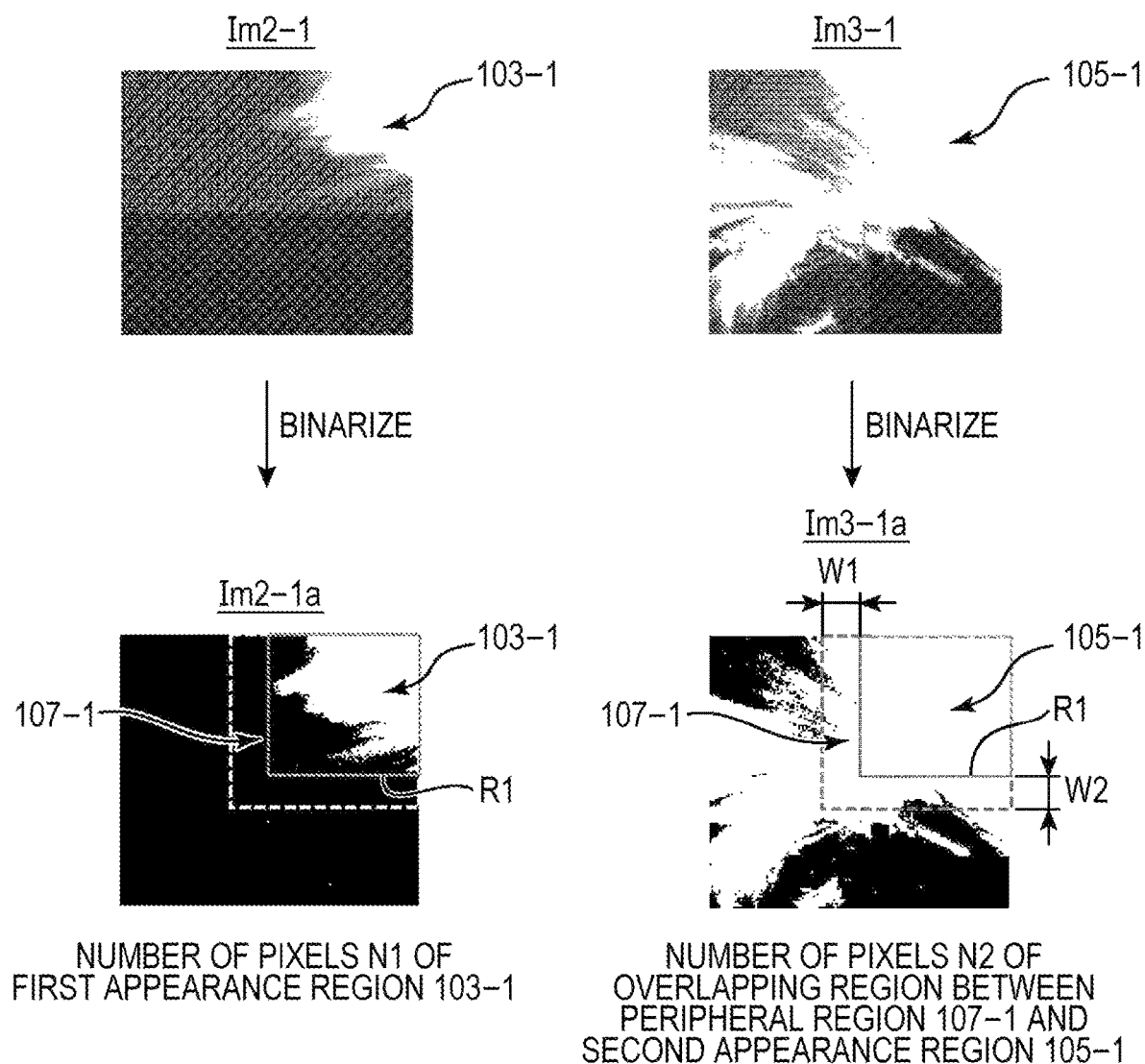
FIG. 17A provides image views illustrating: the second image illustrated in FIG. 16A; a second image obtained by binarizing this; the third image illustrated in FIG. 16A; and a third image obtained by binarizing this.

Next, a description will be provided for identification on whether it is the event in which the gas constantly comes out from the same position or the event in which the gaseous substance is flowing (step S103 in FIG. 12). FIG. 17A provides image views illustrating the second image Im2-1 illustrated in FIG. 16A, a second image Im2-1a obtained by binarizing this, the third image Im3-1 illustrated in FIG. 16A, and a third image Im3-1a obtained by binarizing this. In FIG. 17A, not entire portions of these images but portions of these images corresponding to the infrared image Im0-1 illustrated in FIG. 13A are illustrated.

The setter 94 illustrated in FIG. 1A generates the second image Im2-1a obtained by binarizing the second image Im2-1 while setting, as a pixel constituting a first appearance region 103-1, a pixel having a value exceeding a predetermined Th1 in the second image Im2-1. The setter 94 picks out (extracts) the first appearance region 103-1 by using a known method such as morphology, and sets a rectangle circumscribed with the first appearance region 103-1 in the second image Im2-1a. Consequently, a circumscribed rectangle R1 is set in the first appearance region 103-1 of the second image Im2-1a. A position of the circumscribed rectangle R1 is set as a position of the first appearance region 103-1. The setter 94 sets a peripheral region 107-1 in contact with the circumscribed rectangle R1 outside the circumscribed rectangle R1.

The setter 94 generates the third image Im3-1a obtained by binarizing the third image Im3-1 while setting, as a pixel constituting a second appearance region 105-1, a pixel having a value exceeding a predetermined Th2 in the third image Im3-1. The setter 94 sets, in the third image Im3-1a, a peripheral region 107-1 at a position corresponding to the position of the peripheral region 107-1 set in the second image Im2-1a. Thus, the setter 94 sets, in the third image Im3-1a, the peripheral region 107-1 in the periphery of the position corresponding to the position of the first appearance region 103-1 of the second image Im2-1a. The peripheral region 107-1 set in the second image Im2-1a has a coordinate position, a shape, and the area which are the same as those of the peripheral region 107-1 set in the third image Im3-1a.

Figure 17B:
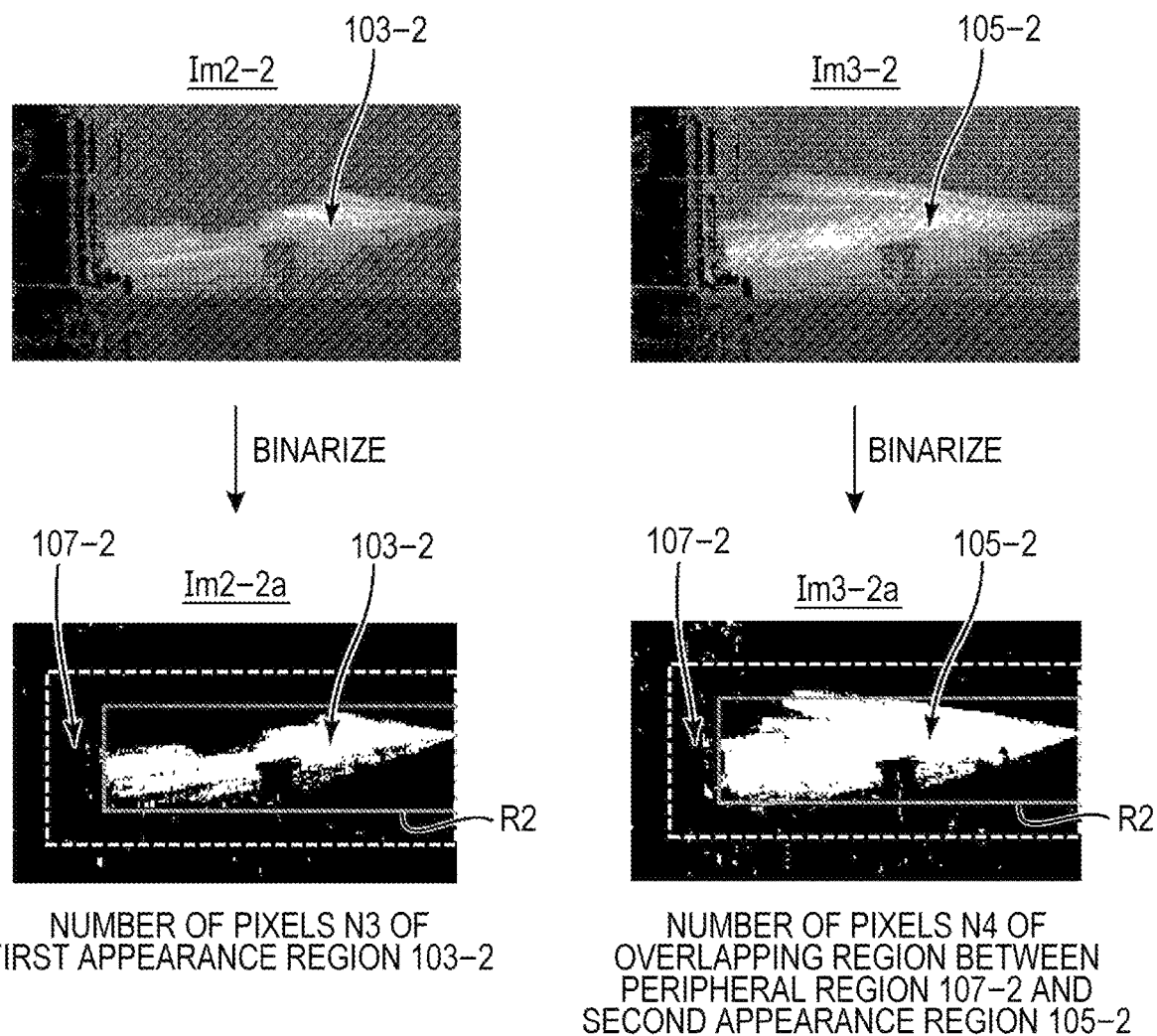
FIG. 17B provides image views illustrating: the second image illustrated in FIG. 16B; a second image obtained by binarizing this; the third image illustrated in FIG. 16B; and a third image obtained by binarizing this.

FIG. 17B provides image views illustrating the second image Im2-2 illustrated in FIG. 16B, a second image Im2-2a obtained by binarizing this, the third image Im3-2 illustrated in FIG. 16B, and a third image Im3-2a obtained by binarizing this. In FIG. 17B, not entire portions of these images but portions of these images corresponding to the infrared image Im0-2 illustrated in FIG. 13B are illustrated.

The setter 94 generates the second image Im2-2a obtained by binarizing the second image Im2-2 while setting, as a pixel constituting a first appearance region 103-2, a pixel having a value exceeding the threshold Th1 in the second image Im2-2. The setter 94 picks out (extracts) the first appearance region 103-2 by using the known method such as morphology, and sets a rectangle circumscribed with the first appearance region 103-2 in the second image Im2-2a. Consequently, a circumscribed rectangle R2 is set in the first appearance region 103-2 of the second image Im2-2a. A position of the circumscribed rectangle R2 is set as a position of the first appearance region 103-2. The setter 94 sets a peripheral region 107-2 in contact with the circumscribed rectangle R2 outside the circumscribed rectangle R2.

The setter 94 generates the third image Im3-2a obtained by binarizing the third image Im3-2 while setting, as a pixel constituting a second appearance region 105-2, a pixel exceeding the threshold value Th2 in the third image Im3-2. The setter 94 sets, in the third image Im3-2a, a peripheral region 107-2 at a position corresponding to the position of the peripheral region 107-2 set in the second image Im2-2a. Thus, the setter 94 sets, in the third image Im3-2a, the peripheral region 107-2 in the periphery of the position corresponding to the position of the first appearance region 103-2 of the second image Im2-2a. The peripheral region 107-2 set in the second image Im2-2a has a coordinate position, a shape, and the area which are the same as those of the peripheral region 107-2 set in the third image Im3-2a.

A peripheral region 107 will be described with reference to the peripheral region 107-1 (FIG. 17A) set in the third image Im3-1a. The peripheral region 107 includes a rectangle region extending in a vertical direction and a rectangle region extending in a lateral direction of the third image Im3. A width W1 of the vertically-extending rectangle region and a width W2 of the laterally-extending rectangle region may be the same, or may be changed in accordance with an aspect ratio of the third image Im3. In the latter case, when the aspect ratio of the third image Im3 is 4:3, for example, a ratio of W1:W2 is set to 4:3.

The widths W1 and W2 are arbitrary but preferably have a certain degree of size. For example, the size is set to 30% in each of the vertical length and the lateral length of the circumscribed rectangle R1 (the width W1 is set to 30% of the size in the lateral direction of the circumscribed rectangle R1, and the width W2 is set to 30% of the size in the vertical direction of the circumscribed rectangle R1). In the embodiment, in a case of the event in which the gas constantly comes out from the same position, identification between the event in which the gas comes out from the same position and the event in which the gaseous substance is flowing is made based on a premise that the peripheral region 107 is not covered by the second appearance region 105 (FIG. 17B). In the event in which the gas constantly comes out from the same position, the second appearance region 105 may also slightly protrude to the peripheral region 107 due to gas fluctuation. When the widths W1 and W2 are too short, the peripheral region 107 may be covered by the second appearance region 105 even when the second appearance region 105 slightly protrudes to the peripheral region 107. To prevent this, the widths W1 and W2 are required to have the certain degree of the size.

Referring to FIG. 17A, the identificator 95 (FIG. 1A) determines that it is the event in which the gaseous substance is flowing when a ratio of the number of pixels N2 exceeds a predetermined first threshold (e.g., 100%) among the number of pixels N1 (number of white pixels) of the first appearance region 103-1 of the second image Im2-1a and the number of pixels N2 (number of white pixels) of an overlapping region between the peripheral region 107-1 and the second appearance region 105-1 set in the third image Im3-1a, and the identificator determines that it is the event in which the gas constantly comes out from the same position when the ratio is the first threshold or less. Here, the identificator 95 determines that it is the event in which the gaseous substance is flowing. The number of pixels can be rephrased as the area. The following number of pixels is also the same.

Referring to FIG. 17B, the identificator 95 determines that it is the event in which the gaseous substance is flowing when a ratio of the number of pixels N4 exceeds the first threshold (e.g., 100%) among the number of pixels N3 (number of white pixels) of the first appearance region 103-2 of the second image Im2-2a and the number of pixels N4 (number of white pixels) of an overlapping region between the peripheral region 107-2 and the second appearance region 105-2 set in the third image Im3-2a, and the identificator determines that it is the event in which the gas constantly comes out from the same position when the ratio is the first threshold or less. Here, the identificator 95 determines that it is the event in which the gas constantly comes out from the same position.

Note that the identificator 95 may make the above-described determination based on the number of pixels of the peripheral region 107 set in the third image Im3 and the number of pixels (number of white pixels) of the overlapping region between the second appearance region 105 and the peripheral region 107 set in the third image Im3. More specifically, referring to FIG. 17A, the identificator 95 determines that it is the event in which the gaseous substance is flowing when the ratio of the number of pixels N2 exceeds a predetermined second threshold among the number of pixels N5 of the peripheral region 107-1 set in the third image Im3-1a and the number of pixels N2 (number of white pixels) of the overlapping region between the peripheral region 107-1 and the second appearance region 105-1 set in the third image Im3-1a, and the identificator determines that it is the event in which the gas constantly comes out from the same position when the ratio is the second threshold or less. Referring to FIG. 17B, the identificator 95 determines that it is the event in which the gaseous substance is flowing when a ratio of the number of pixels N4 exceeds the second threshold among the number of pixels N6 of the peripheral region 107-2 set in the third image Im3-2a and the number of pixels N4 (number of white pixels) of the overlapping region between the peripheral region 107-2 and the second appearance region 105-2 set in the third image Im3-2a, and the identificator determines that it is the event in which the gas constantly comes out from the same position when the ratio is the second threshold or less.

Additionally, the identificator 95 may make the above-described determination based on the number of pixels (number of white pixels) in the second appearance region 105 and the number of pixels (number of white pixels) of the overlapping region between the peripheral region 107 and the second appearance region 105 set in the third image Im3. More specifically, referring to FIG. 17A, the identificator 95 determines that it is the event in which the gaseous substance is flowing when the ratio of the number of pixels N2 exceeds a third threshold among the number of pixels N7 (number of white pixels) of the second appearance region 105-1 and the number of pixels N2 (number of white pixels) of the overlapping region between the peripheral region 107-1 and the second appearance region 105-1 set in the third image Im3-1a, and the identificator determines that it is the event in which the gas constantly comes out from the same position when the ratio is the third threshold or less. Referring to FIG. 17B, the identificator 95 determines that it is the event in which the gaseous substance is flowing when a ratio of the number of pixels N4 exceeds the third threshold among the number of pixels N8 (number of white pixels) of the second appearance region 105-2 and the number of pixels N4 (number of white pixels) of the overlapping region between the peripheral region 107-2 and the second appearance region 105-2 set in the third image Im3-2a, and the identificator determines that it is the event in which the gas constantly comes out from the same position when the ratio is the third threshold or less.

The identificator 95 uses a binarized image to identify whether it is the event in which the gas constantly comes out from the same position and the event in which the gaseous substance is flowing, but a gray scale image may also be used. Referring to FIGS. 17A and 17B, for example, the identificator 95 determines that it is the case where the gaseous substance is flowing when a ratio of a cumulative value of luminance values of pixels constituting a peripheral region 107-1 (not illustrated) set in the third image Im3-1 exceeds a predetermined fourth threshold among the former cumulative value and a cumulative value of luminance values of pixels constituting a rectangle region R1 (not illustrated) set in the second image Im2-1, and the identificator determines that it is the event in which the gas constantly comes out of the same position when the ratio is the fourth threshold or less.

Main functions and effects of the embodiment will be described. In a case of the event in which the gaseous substance is flowing, positions of gas candidate regions do not coincide with each other when comparing respective time points in predetermined period (here, the predetermined period is a generic term for the first predetermined period and the second predetermined period). Therefore, in a case where an appearance region (the appearance region is a generic term of the first appearance region 103 and the second appearance region 105) is set as a region where the gas candidate region has appeared in an entire part of the predetermined period, the appearance region is not extracted, or the area of the appearance region is reduced even though extracted. The similar is applied to the event in which the gas constantly comes out from the same position. The reason is that: since the gas fluctuates irregularly, the positions of the gas candidate regions do not coincide with each other when comparing the respective time points in the predetermined period (FIG. 14).

Hence, the appearance region is to be set as a region indicating that the gas candidate region has appeared in at least a part of the predetermined period. With such a setting, the area of the appearance region can be made constantly relatively large in both of the event in which the gaseous substance is flowing and the event in which the gas constantly comes out from the same position (the first appearance regions 103-3, 103-1, 103-4, and the second appearance region 105-1 illustrated in FIG. 16A, and the first appearance regions 103-5, 103-2, 103-6, and the second appearance region 105-2 illustrated in FIG. 16B).

Referring to FIGS. 17A and 17B, the position of peripheral region 107 in the third image Im3 is in the periphery of the position corresponding to the position of first appearance region 103 of the second image Im2. Therefore, in a case of setting the peripheral region 107 in the second image Im2, the peripheral region 107 is present in the periphery of the first appearance region 103 of the second image Im2, and therefore, the first appearance region 103 of the second image Im2 does not protrude to the peripheral region 107 in both of the event in which the gaseous substance is flowing and the event in which the gas constantly comes out from the same position.

In the case of the event in which the gaseous substance is flowing, the second appearance region 105 of the third image Im3 may largely protrude to the peripheral region 107 set in the third image Im3, but in the case of the event in which the gas constantly comes out from the same position, the second appearance region 105 does not largely protrude thereto. This will be described more in detail. As illustrated in FIGS. 15A and 15B, the first appearance region 103 of the second image Im2 is extracted by using the two or more (one hundred fifty pieces) of the first images Im1 corresponding to the first predetermined period (5 seconds), and as illustrated in FIGS. 16A and 16B, the second appearance region 105 of the third image Im3 is extracted by using the three second images Im2 (in other words, extracted by using the two or more (four hundred and fifty pieces) of second images Im2 corresponding to the second predetermined period (15 seconds) different from the first predetermined period). In the event in which the gaseous substance is flowing, the position of the gaseous substance is changed with time, and therefore, as illustrated in FIG. 17A, the first appearance region 103 of the second image Im2 has a position and a shape largely different from those of the second appearance region 105 of the third image Im3 (in a case where the second predetermined period is longer than the first predetermined period, the second appearance region 105 of the third image Im3 spreads larger than the first appearance region 103 of the second image Im2). Therefore, the second appearance region 105 of the third image Im3 may largely protrude to the peripheral region 107 (the second appearance region 105-1 illustrated in FIG. 17A). Accordingly, the area of the region (overlapping region) where the peripheral region 107 overlaps with the second appearance region 105 of the third image Im3 becomes relatively large.

On the other hand, in the case of the event in which the gas constantly comes out from the same position, the position from which the gas comes out is not changed with time, and therefore, as illustrated in 17B, even when the first predetermined period differs from the second predetermined period, the first appearance region 103 of the second image Im2 does not have a position and a shape largely different from those of the second appearance region 105 of the third image Im3. Therefore, the second appearance region 105 of the third image Im3 does not protrude to the peripheral region 107, or even though protruding, the second appearance region 105 does not largely protrude thereto (second appearance region 105-2 illustrated in FIG. 17B). Accordingly, the region (overlapping region) where the peripheral region 107 overlaps with the second appearance region 105 of the third image Im3 is not generated, or even when generated, the area thereof is relatively small.

According to the above, focusing on the peripheral region 107 set in the third image Im3 and the second appearance region 105 of the third image Im3 enables identification between the event in which the gas constantly comes out from the same position and the event in which the gaseous substance is flowing. As a result, according to the embodiment, gas detection accuracy can be improved.

Figure 18A:
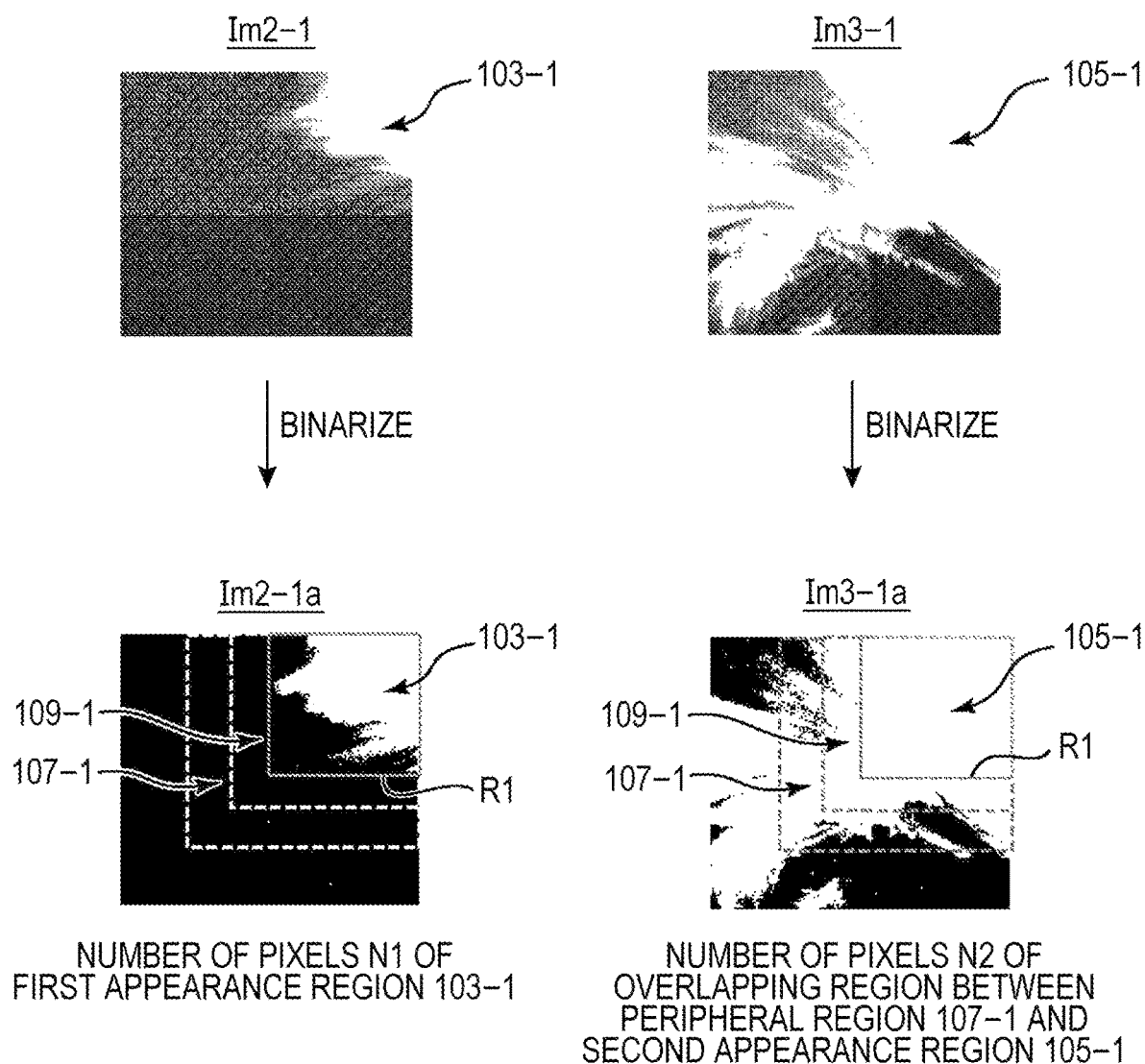
FIG. 18A provides image views illustrating: the second image illustrated in FIG. 16A; a second image obtained by binarizing this; the third image illustrated in FIG. 16A; and a third image obtained by binarizing this according to a modified example.

Modified examples of the embodiment will be described. The setter 94 (FIG. 1A) sets a peripheral region 107 in a third image Im3 via an intermediate region 109 in a periphery of a position corresponding to a position of a first appearance region 103 of a second image Im2. FIG. 18A provides image views illustrating: the second image Im2-1 illustrated in FIG. 16A, a second image Im2-1a obtained by binarizing this, the third image Im3-1 illustrated in FIG. 16A, and a third image Im3-1a obtained by binarizing this according to a modified example. In FIG. 18A, not entire portions of these images but portions of these images corresponding to the infrared image Im0-1 illustrated in FIG. 13A are illustrated. FIG. 18A differs from the FIG. 17A in that an intermediate region 109-1 is set.

Figure 18B:
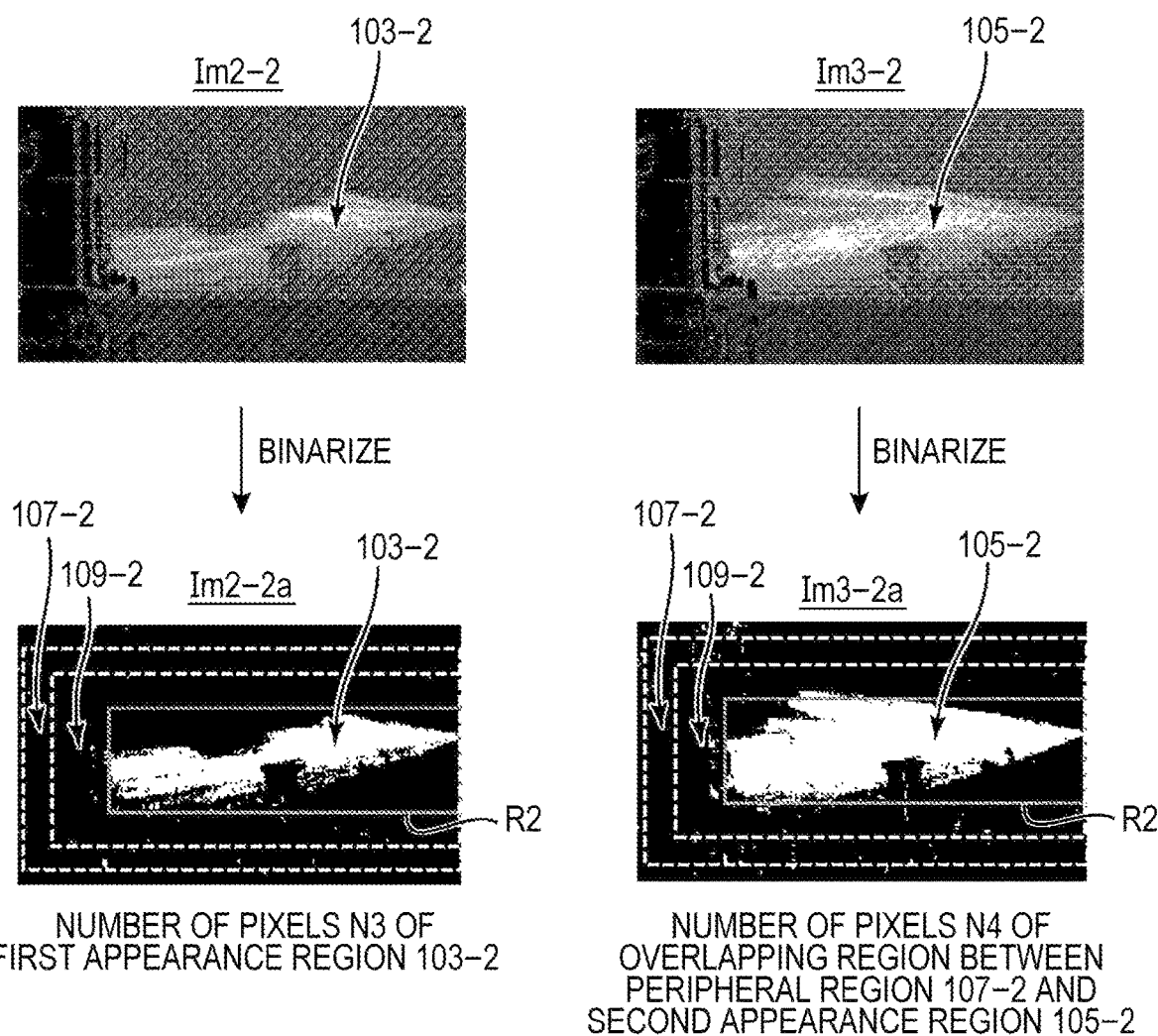
FIG. 18B provides image views illustrating: the second image illustrated in FIG. 16B; a second image obtained by binarizing this; the third image illustrated in FIG. 16B; and a third image obtained by binarizing this, according to a modified example.

FIG. 18B provides image views illustrating the second image Im2-2 illustrated in FIG. 16B, a second image Im2-2a obtained by binarizing this, the third image Im3-2 illustrated in FIG. 16B, and a third image Im3-2a obtained by binarizing this according to a modified example. In FIG. 18B, not entire portions of these images but portions of these images corresponding to the infrared image Im0-2 illustrated in FIG. 13B are illustrated. FIG. 18B differs from FIG. 17B is that an intermediate region 109-2 is set.

In the event in which the gas constantly comes out from the same position, the gas may slightly fluctuate due to a change in a wind direction or a wind speed. Without presence of the intermediate region 109, the second appearance region 105 of the third image Im3 protrudes to the peripheral region 107 set in the third image Im3. With presence of the intermediate region 109, the second appearance region 105 of the third image Im3 protrudes to the intermediate region 109 but does not reach the peripheral region 107. On the other hand, in the case of the event in which the gaseous substance is flowing, the second appearance region 105 of the third image Im3 protrudes to the peripheral region 107 beyond the intermediate region 109 (second appearance region 105-1 illustrated in FIG. 18A) even with presence of the intermediate region 109. In the case of the gaseous substance that is flowing, a region where the gaseous substance is present is moved, and therefore, the region is moved to the peripheral region 107 beyond the intermediate region 109. Accordingly, according to the modified example, even when the gas slightly fluctuates in the event in which the gas constantly comes out from the same position, it is possible to identify the event in which the gas constantly comes out from the same position from the event in which the gaseous substance is flowing.

The intermediate region 109 is located in the periphery of the peripheral region 107, and includes a rectangle region extending in the vertical direction and a rectangle region extending in the lateral direction in each of the second image Im2 and the third image Im3 in a manner similar to the peripheral region 107. Assuming fluctuation caused by a change in the wind direction or the wind speed during an extraction period (15 seconds in this example) of a second appearance region 105, a width of the intermediate region 109 is set to, for example, a 10% size in each of the vertical and lateral directions of the circumscribed rectangles (circumscribed rectangles R1 and R2) surrounding the first appearance region 103 (in the lateral direction of the circumscribed rectangle, the width of the intermediate region 109 is a 10% size in the lateral direction of the circumscribed rectangle, and in the vertical direction of the circumscribed rectangle, the width of the intermediate region 109 is a 10% size in the vertical direction of the circumscribed rectangle).

Conclusion of Embodiments

A gas-detection image processing device according to a first aspect of the embodiment includes: a first processor that generates a plurality of first images by applying processing to extract a gas candidate region to each of a plurality of infrared images captured in time series; a second processor that generates a second image including a first appearance region based on two or more of the first images corresponding to a first predetermined period out of the plurality of first images, the first appearance region indicating that the gas candidate region has appeared in at least a part of the first predetermined period; a third processor that generates a third image including a second appearance region based on two or more of the first images corresponding to a second predetermined period different from the first predetermined period out of the plurality of first images, the second appearance region indicating that the gas candidate region has appeared in at least a part of the second predetermined period; and a setter that sets, in the third image, a peripheral region in a periphery of a position corresponding to a position of the first appearance region of the second image.

A gas that constantly comes out from the same position is a gas to be detected, and a gaseous substance that is flowing (for example, cloud or steam) is a gas not to be detected.

In a case of an event in which the gaseous substance is flowing, positions of gas candidate regions do not coincide with each other when comparing respective time points in predetermined period (here, the predetermined period is a generic term for the first predetermined period and the second predetermined period). Therefore, in a case where the appearance region (the appearance region is a generic term of the first appearance region and the second appearance region) is set as a region where the gas candidate region has appeared in an entire part of the predetermined period, the appearance region is not extracted or the area of the appearance region is reduced even though extracted. The similar is applied to the event in which the gas constantly comes out from the same position. The reason is that: since the gas fluctuates irregularly, the positions of the gas candidate regions do not coincide with each other when comparing respective time points in the predetermined period.

Hence, the appearance region is to be set as a region indicating that the gas candidate region has appeared in at least a part of the predetermined period. With such a setting, the area of the appearance region can be made constantly relatively large in both of the event in which the gaseous substance is flowing and the event in which the gas constantly comes out from the same position.

In the third image, a position of the peripheral region is a periphery of a position corresponding to a position of the first appearance region of the second image. Therefore, in a case of setting the peripheral region in the second image, the peripheral region is present in the periphery of the first appearance region of the second image, and therefore, the first appearance region of the second image does not protrude to the peripheral region in both of the event in which the gaseous substance is flowing and the event in which the gas constantly comes out from the same position.

In the case of the event in which the gaseous substance is flowing, the second appearance region of the third image may largely protrude to the peripheral region set in the third image, but in the case of the event in which the gas constantly comes out from the same position, the second appearance region does not largely protrude thereto. This will be described more in detail. The first appearance region of the second image is extracted by using the two or more of the first images corresponding to the first predetermined period, and the second appearance region of the third image is extracted by using the two or more image of first images corresponding to the second predetermined period different from the first predetermined period. In the event in which the gaseous substance is flowing, the position of the gaseous substance is changed with time, and therefore, the first appearance region of the second image has a position and a shape largely different from those of the second appearance region of the third image (in a case where the second predetermined period is longer than the first predetermined period, the second appearance region of the third image spreads larger than the first appearance region of the second image). Therefore, the second appearance region of the third image may largely protrude to the peripheral region. Accordingly, the area of a region where the peripheral region overlaps with the second appearance region of the third image becomes relatively large.

On the other hand, in the case of the event in which the gas constantly comes out from the same position, the position from which the gas comes out is not changed with time, and therefore, even when the first predetermined period differs from the second predetermined period, the first appearance region of the second image does not have a position and a shape largely different from those of the second appearance region of the third image. Therefore, the second appearance region of the third image does not protrude to the peripheral region, or even though protruding, the second appearance region does not largely protrude thereto. Accordingly, the region where the peripheral region overlaps with the second appearance region of the third image is not generated, or even when generated, the area thereof is relatively small.

According to the above, focusing on the peripheral region set in the third image and the second appearance region of the third image enables identification between the event in which the gas constantly comes out from the same position and the event in which the gaseous substance is flowing. Accordingly, according to the gas-detection image processing device according to the first aspect of the embodiment, gas detection accuracy can be improved.

Note that the second predetermined period is set as a period longer than the first predetermined period. Additionally, the second predetermined period includes at least a part of the first predetermined period. Preferably, the second predetermined period includes the entire first predetermined period.

The identificator that executes the above-described identification includes the followings (1) to (3).

(1) The identificator performs identification between the event in which the gas constantly comes out from the same position and the event in which the gaseous substance is flowing, based on a first appearance region of a second image and a region where a peripheral region set in a third image overlaps with a second appearance region of the third image (hereinafter, as the overlapping region). For example, when the second image and the third image are binarized images, the identification is performed as follows. The identificator determines that it is the event in which the gaseous substance is flowing when a ratio of the area of the overlapping region exceeds a predetermined first threshold among the area of the first appearance region of the second image and the area of the overlapping region, and the identificator determines that it is the event in which the gas constantly comes out from the same position when the ratio is the first threshold or less.

(2) The identificator performs identification between the event in which the gas constantly comes out from the same position and the event in which the gaseous substance is flowing, based on the peripheral region set in the third image and a region where the peripheral region set in the third image overlaps with the second appearance region of the third image (hereinafter, as the overlapping region). For example, when the third image is a binarized image, identification is made as follows. The identificator determines that it is the event in which the gaseous substance is flowing when a ratio of the area of the overlapping region exceeds a predetermined second threshold among the area of the peripheral region and the area of the overlapping region, and the identificator determines that it is the event in which the gas constantly comes out from the same position when the ratio is the second threshold or less.

(3) The identificator performs identification between the event in which the gas constantly comes out from the same position and the event in which the gaseous substance is flowing, based on the second appearance region of the third image and a region where the peripheral region set in the third image overlaps with the second appearance region of the third image (hereinafter, as the overlapping region). For example, when the third image is a binarized image, identification is made as follows. The identificator determines that it is the event in which the gaseous substance is flowing when a ratio of the area of the overlapping region exceeds a predetermined third threshold among the area of the second appearance region of the third image and the area of the overlapping region, and the identificator determines that it is the event in which the gas constantly comes out from the same position when the ratio is the third threshold or less.

In the above configurations, the third processor generates the third image including the second appearance region based on the two or more of first images corresponding to the second predetermined period longer than the first predetermined period.

In the case of the event in which the gaseous substance is flowing, the position of the gaseous substance is changed with time. Therefore, when the second predetermined period is longer than the first predetermined period, the second appearance region of the third image spreads larger than the first appearance region of the second image. Accordingly, the area of the region where the peripheral region set in the third image overlaps with the second appearance region of the third image is increased. On the other hand, in the case of the event in which the gas constantly comes out from the same position, the position from where the gas comes out is not changed with time. Therefore, even when the second predetermined period is longer than the first predetermined period, the second appearance region of the third image does not spread larger than the first appearance region of the second image. Accordingly, the region where the peripheral region set in the third image overlaps with the second appearance region of the third image is not generated, or even when generated, the area thereof is relatively small.

According to the above, focusing on the region where the peripheral region set in the third image overlaps with the second appearance region of the third image enables identification between the event in which the gas constantly comes out from the same position and the event in which the gaseous substance is flowing.

In the above configurations, the setter sets, in the third image, the peripheral region in the periphery of a position corresponding to the position of the first appearance region of the second image via the intermediate region.

In the event in which the gas constantly comes out from the same position, the gas may slightly fluctuate due to a change in a wind direction or a wind speed. Without presence of the intermediate region, the second appearance region of the third image protrudes to the peripheral region set in the third image. With presence of the intermediate region, the second appearance region of the third image protrudes to the intermediate region but does not reach the peripheral region. On the other hand, in the case of the event in which the gaseous substance is flowing, the second appearance region of the third image protrudes beyond the intermediate region and protrudes to the peripheral region even with the presence of the intermediate region. In the case of the gaseous substance that is flowing, the region in which the gaseous substance is present is moved, and therefore, the region is moved to the peripheral region beyond the intermediate region. Therefore, according to this configuration, even when the gas slightly fluctuates in the event in which the gas constantly comes out from the same position, it is possible to identify the event in which the gas constantly comes out from the same position from the event in which the gaseous substance is flowing.

A gas-detection image processing method according to a second aspect of the embodiment includes: a first processing step of generating a plurality of first images by applying processing to extract a gas candidate region to each of a plurality of infrared images captured in time series; a second processing step of generating, based on two or more of the first images corresponding to a first predetermined period out of the plurality of first images, a second image including a first appearance region indicating that the gas candidate region has appeared in at least a part of the first predetermined period; a third processing step of generating, based on two or more of the first images corresponding to a second predetermined period different from the first predetermined period out of the plurality of first images, a third image including a second appearance region indicating that the gas candidate region has appeared in at least a part of the second predetermined period; and a setting step of setting, in the third image, a peripheral region in a periphery of a position corresponding to a position of the first appearance region of the second image.

The gas-detection image processing method according to the second aspect of the embodiment defines the gas-detection image processing device according to the first aspect of the embodiment from the viewpoint of the method, and provides functions and effects similar to those of the gas-detection image processing device according to the first aspect of the embodiment.

A gas-detection image processing program according to a third aspect of the embodiment, causing a computer to execute: a first processing step of generating a plurality of first images by applying processing to extract a gas candidate region to each of a plurality of infrared images captured in time series; a second processing step of generating, based on two or more of the first images corresponding to a first predetermined period out of the plurality of first images, a second image including a first appearance region indicating that the gas candidate region has appeared in at least a part of the first predetermined period; a third processing step of generating, based on two or more of the first images corresponding to a second predetermined period different from the first predetermined period out of the plurality of first images, a third image including a second appearance region indicating that the gas candidate region has appeared in at least a part of the second predetermined period; and a setting step of setting, in the third image, a peripheral region in a periphery of a position corresponding to a position of the first appearance region of the second image.

The gas-detection image processing program according to the third aspect of the embodiment defines the gas-detection image processing device according to the first aspect of the embodiment from the viewpoint of the program, and provides the functions and effects similar to those of the gas-detection image processing device according to the first aspect of the embodiment.

The embodiments of the present invention have been illustrated and described in detail, but note that those are simply examples and practical example, and not intended to be limitative. The scope of the present invention should be construed by the wordings of the appended claims.

The entire disclosure of Japanese Patent Application No. 2017-091796 filed on May 2, 2017 is hereby incorporated by reference in its entirety.

INDUSTRIAL APPLICABILITY

According to the present invention, it is possible to provide a gas-detection image processing device, a gas-detection image processing method, and a gas-detection image processing program.

The invention claimed is:
1. A gas-detection image processing device comprising:
a hardware processor configured to perform:
a first processing that generates a plurality of first images by applying processing to extract a gas candidate region to each of a plurality of infrared images captured in time series, wherein the plurality of infrared images is captured in a specific single wavelength band corresponding to the type of gas to be detected;
a second processing that generates a second image including a first appearance region based on two or more of the first images corresponding to a first predetermined period out of the plurality of first images, the first appearance region indicating that the gas candidate region has appeared in at least a part of the first predetermined period;
a third processing that generates a third image including a second appearance region based on two or more of the first images corresponding to a second predetermined period different from the first predetermined period out of the plurality of first images, the second appearance region indicating that the gas candidate region has appeared in at least a part of the second predetermined period;
a setter that sets, in the third image, a peripheral region in a periphery of a position corresponding to the position of the first appearance region of the second image; and
an identificator that identifies whether the gas candidate region is a region where gas comes out from a same position, or a region where gas is flowing, based on a size of the second appearance region in the peripheral region.

2. The gas-detection image processing device according to claim 1, wherein the third processing generates the third image including the second appearance region based on the two or more of the first images corresponding to the second predetermined period longer than the first predetermined period.

3. The gas-detection image processing device according to claim 1, wherein the identificator that performs, based on the first appearance region and a region where the peripheral region overlaps with the second appearance region, identification between an event in which a gas constantly comes out from a same position and an event in which a gaseous substance is flowing.

4. The gas-detection image processing device according to claim 1, wherein the identificator that performs, based on the peripheral region and a region where the peripheral region overlaps with the second appearance region, identification between an event in which a gas constantly comes out from a same position and an event in which a gaseous substance is flowing.

5. The gas-detection image processing device according to claim 1, wherein the identificator that performs, based on the second appearance region and a region where the peripheral region overlaps with the second appearance region, identification between an event in which a gas constantly comes out from a same position and an event in which a gaseous substance is flowing.

6. The gas-detection image processing device according to claim 1, wherein the setter sets, in the third image, the peripheral region via an intermediate region in the periphery of the position corresponding to the position of the first appearance region of the second image.

7. A gas-detection image processing method comprising:
generating a plurality of first images by applying processing to extract a gas candidate region to each of a plurality of infrared images captured in time series, wherein the plurality of infrared images is captured in a specific single wavelength band corresponding to the type of gas to be detected;
generating a second image including a first appearance region based on two or more of the first images corresponding to a first predetermined period out of the plurality of first images, the first appearance region indicating that the gas candidate region has appeared in at least a part of the first predetermined period;
generating a third image including a second appearance region based on two or more of the first images corresponding to a second predetermined period different from the first predetermined period out of the plurality of first images, the second appearance region indicating that the gas candidate region has appeared in at least a part of the second predetermined period;
setting, in the third image, a peripheral region in a periphery of a position corresponding to a position of the first appearance region of the second image; and
identifying by an identificator whether the gas candidate region is a region where gas comes out from a same position, or a region where gas is flowing, based on a size of the second appearance region in the peripheral region.

8. A non-transitory recording medium storing a computer readable gas-detection image processing program causing a computer to execute:
generating a plurality of first images by applying processing to extract a gas candidate region to each of a plurality of infrared images captured in time series, wherein the plurality of infrared images is captured in a specific single wavelength band corresponding to the type of gas to be detected;
generating a second image including a first appearance region based on two or more of the first images corresponding to a first predetermined period out of the plurality of first images, the first appearance region indicating that the gas candidate region has appeared in at least a part of the first predetermined period;
generating a third image including a second appearance region based on two or more of the first images corresponding to a second predetermined period different from the first predetermined period out of the plurality of first images, the second appearance region indicating that the gas candidate region has appeared in at least a part of the second predetermined period;
setting, in the third image, a peripheral region in a periphery of a position corresponding to a position of the first appearance region of the second image; and
identifying by an identificator whether the gas candidate region is a region where gas comes out from a same position, or a region where gas is flowing, based on a size of the second appearance region in the peripheral region.

9. The gas-detection image processing device according to claim 2, further comprising an identificator that performs, based on the first appearance region and a region where the peripheral region overlaps with the second appearance region, identification between an event in which a gas constantly comes out from a same position and an event in which a gaseous substance is flowing.

10. The gas-detection image processing device according to claim 2, further comprising an identificator that performs, based on the peripheral region and a region where the peripheral region overlaps with the second appearance region, identification between an event in which a gas constantly comes out from a same position and an event in which a gaseous substance is flowing.

11. The gas-detection image processing device according to claim 2, further comprising an identificator that performs, based on the second appearance region and a region where the peripheral region overlaps with the second appearance region, identification between an event in which a gas constantly comes out from a same position and an event in which a gaseous substance is flowing.

12. The gas-detection image processing device according to claim 2, wherein the setter sets, in the third image, the peripheral region via an intermediate region in a periphery of a position corresponding to a position of the first appearance region of the second image.

13. The gas-detection image processing device according to claim 3, wherein the setter sets, in the third image, the peripheral region via an intermediate region in a periphery of a position corresponding to a position of the first appearance region of the second image.

14. The gas-detection image processing device according to claim 4, wherein the setter sets, in the third image, the peripheral region via an intermediate region in a periphery of a position corresponding to a position of the first appearance region of the second image.

15. The gas-detection image processing device according to claim 5, wherein the setter sets, in the third image, the peripheral region via an intermediate region in a periphery of a position corresponding to a position of the first appearance region of the second image.

16. The gas-detection image processing device according to claim 1, wherein the region where gas is flowing includes cloud or steam.

17. The gas-detection image processing device according to claim 7, wherein the region where gas is flowing includes cloud or steam.

* * * * *